US012811892B2

(12) United States Patent
Jochim et al.

(10) Patent No.: US 12,811,892 B2

(45) Date of Patent: Nov. 24, 2026

(54) SYSTEM AND METHOD FOR CONTROLLING DATA TRANSMISSION ON A NETWORK USING A DYNAMIC SLOT FILLING SCHEDULE

(71) Applicant: GM Global Technology Operations LLC, Detroit, MI (US)

(72) Inventors: Markus Jochim, Troy, MI (US); Bhagyashri Katti, Novi, MI (US); Soheil Samii, Birmingham, MI (US); Steve DiBella, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/208,050

(22) Filed: May 14, 2025

(65) Prior Publication Data

US 2026/0370611 A1 Nov. 19, 2026

(51) Int. Cl.

*H04L 47/6275* (2022.01)
*H04L 12/413* (2006.01)
*H04L 47/62* (2022.01)

(52) U.S. Cl.

CPC ........ *H04L 47/6275* (2013.01); *H04L 12/413* (2013.01); *H04L 47/6225* (2013.01)

(58) Field of Classification Search

None

See application file for complete search history.

(56) References Cited

U.S. PATENT DOCUMENTS

2019/0261420 A1 8/2019 Pannell et al.
2020/0067727 A1 2/2020 Pannell
2020/0136857 A1 4/2020 Yun et al.
2022/0200925 A1* 6/2022 Lu ....................... H04L 47/6275
2022/0209986 A1 6/2022 Mutter et al.
2023/0113911 A1* 4/2023 Nomura .................. H04L 47/22 370/230
2024/0121320 A1* 4/2024 Agarwal ............. H04L 49/9015
2024/0147529 A1 5/2024 Loukianov
2025/0132951 A1 4/2025 Michel et al.
2025/0351061 A1* 11/2025 Schnellbacher ..... H04B 17/346
2026/0172281 A1 6/2026 Huang et al.

FOREIGN PATENT DOCUMENTS

DE 10000305 A1 7/2001
DE 102024209812 B3 1/2026
EP 4297348 A1 12/2023

* cited by examiner

*Primary Examiner* — Fadi Haj Said

(74) *Attorney, Agent, or Firm* — Vivacqua Crane, PLLC

(57) ABSTRACT

A network includes a plurality of nodes connected to a 10Base-T1S data bus that communicate data to one another. Each of the plurality of nodes has a functional software block that generates the data, a queuing block that organizes the data based on a determined priority of the data, a scheduling module that determines when the respective node has a transmission opportunity to transmit the data across the 10Base-T1S data bus, and a transmission module that transmits the data across the 10Base-T1S data bus to the plurality of nodes. The scheduling module may schedule transmission opportunities based on a modulo operation based schedule, a repeating pattern schedule, a dynamic slot filling schedule, and a dynamic carrier sense multiple access with collision detection (CSMA-CD) slot filling schedule.

15 Claims, 10 Drawing Sheets

80

| | | | | | | |
|---|---|---|---|---|---|---|
| $m_i$ | 1 | 1 | 4 | 4 | 4 | 4 |
| $o_i$ | 0 | 0 | 3 | 2 | 1 | 0 |

78

76, 12

| $cc_i$ | N0 | N1 | N2 | N3 | N4 | N5 | |
|---|---|---|---|---|---|---|---|
| 1 | X | X | X | | | | 3 |
| 2 | X | X | | X | | | 3 |
| 3 | X | X | | | X | | 3 |
| 4 | X | X | | | | X | 3 |
| 5 | X | X | X | | | | 3 |
| 6 | X | X | | X | | | 3 |
| 7 | X | X | | | X | | 3 |
| 8 | X | X | | | | X | 3 |
| 9 | X | X | X | | | | 3 |
| 10 | X | X | | X | | | 3 |
| 11 | X | X | | | X | | 3 |
| 12 | X | X | | | | X | 3 |
| 13 | X | X | X | | | | 3 |
| 14 | X | X | | X | | | 3 |
| 15 | X | X | | | X | | 3 |
| 16 | X | X | | | | X | 3 |

FIG. 4

80

| $m_i$ | 1 | 2 | 4 | 2 | 2 | 4 |
|---|---|---|---|---|---|---|
| $o_i$ | 0 | 1 | 3 | 0 | 0 | 1 |

76 12

| $CC_i$ | N0 | N1 | N2 | N3 | N4 | N5 | |
|---|---|---|---|---|---|---|---|
| 1 | X | X | X | | | | ω |
| 2 | X | | | X | X | | ω |
| 3 | X | X | | | | X | ω |
| 4 | X | | | X | X | | ω |
| 5 | X | X | X | | | | ω |
| 6 | X | | | X | X | | ω |
| 7 | X | X | | | | X | ω |
| 8 | X | | | X | X | | ω |
| 9 | X | X | X | | | | ω |
| 10 | X | | | X | X | | ω |
| 11 | X | X | | | | X | ω |
| 12 | X | | | X | X | | ω |
| 13 | X | X | X | | | | ω |
| 14 | X | | | X | X | | ω |
| 15 | X | X | | | | X | ω |
| 16 | X | | | X | X | | ω |

82

FIG. 5

| $cc_i$ | N0, $pd_0$=1 | | N1, $pd_1$=3 | | N2, $pd_2$=3 | |
|---|---|---|---|---|---|---|
| | $cc_i$ mod $dp_0$ | | $cc_i$ mod $dp_1$ | | $cc_i$ mod $dp_2$ | |
| 0 | 0 | X | 0 | X | 0 | |
| 1 | 0 | X | 1 | X | 1 | |
| 2 | 0 | X | 2 | | 2 | X |
| 3 | 0 | X | 0 | X | 0 | |
| 4 | 0 | X | 1 | X | 1 | |
| 5 | 0 | X | 2 | | 2 | X |
| 6 | 0 | X | 0 | X | 0 | |
| 7 | 0 | X | 1 | X | 1 | |
| 8 | 0 | X | 2 | | 2 | X |
| 9 | 0 | X | 0 | X | 0 | |
| 10 | 0 | X | 1 | X | 1 | |
| 11 | 0 | X | 2 | | 2 | X |
| 12 | 0 | X | 0 | X | 0 | |
| 13 | 0 | X | 1 | X | 1 | |
| 14 | 0 | X | 2 | | 2 | X |

FIG. 6

SYSTEM AND METHOD FOR CONTROLLING DATA TRANSMISSION ON A NETWORK USING A DYNAMIC SLOT FILLING SCHEDULE

INTRODUCTION

The present disclosure relates to a method for controlling data transmission on a network using a dynamic slot filling schedule.

In a 10Base-T1S network, a plurality of nodes are connected to a physical transmission medium called a 10Base-T1S data bus. The plurality of nodes communicate Ethernet frames having data payloads to one another across the 10Base-T1S data bus in communication cycles, where a node from the plurality of nodes with a node ID zero transmits a beacon to the plurality of nodes to initiate a given communication cycle. Each of the plurality of nodes has a transmission opportunity in ascending order of a given node ID, and each of the plurality of nodes may have an afforded transmission opportunity go unused when the respective node does not have an Ethernet frame to transmit. The communication cycle method of communication between the plurality of nodes is called physical layer collision avoidance (PLCA). PLCA assists the plurality of nodes with avoiding transmitting Ethernet frames across the 10Base-T1S data bus simultaneously, causing a transmit collision. Due to the number of the plurality of nodes connected to the physical transmission medium and the size of an Ethernet frame to be transmitted across the 10Base-T1S data bus from an individual node, the 10Base-T1S network may experience latency, which may slow down the transmission of critical Ethernet frames to the plurality of nodes. In a worst case latency scenario, in a 10Base-T1S network having a plurality of nodes labeled node ID zero through node ID n, after node ID i, which is an arbitrary node of the nodes in the plurality of nodes, transmits an Ethernet frame, node ID i must wait for node ID i+1 through node ID i−1 to have an opportunity to transmit an Ethernet frame across the 10Base-T1S network before having another opportunity to transmit an Ethernet frame.

Thus, while current 10Base-T1S networks achieve their intended purpose, there is a need for a new and improved system and method for controlling transmission opportunities of the plurality of nodes across the 10Base-T1S data bus.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for controlling data transmission on a network. The method also includes providing a network bus for transmitting the data on the network. The method also includes providing a plurality of low priority network devices and a plurality of high priority network devices where each of the plurality of low priority network devices and each of the plurality of high priority network devices are electrically connected to the network bus, where the data transmitted by the plurality of high priority network devices is of a higher priority to be transmitted than the data transmitted by the plurality of low priority network devices, where each of the plurality of low priority network devices and each of the plurality of high priority network devices have a network controller and where each network controller is programmed to: implement a cycle counter on each of the plurality of low priority network devices and each of the plurality of high priority network devices, assign a network id value to each of the plurality of low priority network devices and each of the plurality of high priority network devices, assign a plurality of network device parameters to each of the plurality of high priority network devices, receive a maximum device transmission value that dictates the combined number of the plurality of low priority network devices and the plurality of high priority network devices that may transmit data on the network bus during an iteration of the cycle counter, and create a schedule for transmission of the data by each of the plurality of low priority network devices and each of the plurality of high priority network devices, where the schedule dictates whether each of the plurality of low priority network devices and each of the plurality of high priority network devices may transmit data and where the schedule allows each of the plurality of high priority network devices to transmit data based on the cycle counter, the plurality of network device parameters, and the maximum device transmission value, and where the schedule allows each of the plurality of low priority network devices to transmit data based on the maximum device transmission value and the network id value of each of the plurality of low priority network devices. Other embodiments of this aspect include corresponding computer systems, apparatus, and computer programs recorded on one or more computer storage devices, each configured to perform the actions of the methods.

Implementations may include one or more of the following features. The method where assign a plurality of network device parameters to each of the plurality of high priority network devices further may include assigning a modulo value. Assign a plurality of network device parameters to each of the plurality of high priority network devices further may include assigning an offset value. Create a schedule for transmission of the data by each of the plurality of low priority network devices and each of the plurality of high priority network devices further may include determining whether the following equation is true $(cc_i+o_i) \bmod m_i=0$ when creating the schedule for transmission of the data for each of the plurality of high priority network devices where: $cc_i$=cycle counter; $o_i$=offset value; and $m_i$=modulo value. Create a schedule for transmission of the data by each of the plurality of low priority network devices and each of the plurality of high priority network devices further may include selecting the values of $m_i$ and $o_i$ such that a predefined number of the plurality of high priority network devices are allowed to transmit data in a cycle. Assign a plurality of network device parameters to each of the plurality of high priority network devices further may include assigning a pattern depth value. The pattern depth value is determined based on a sequence of bits. Assign a plurality of network device parameters to each of the plurality of low priority network devices and each of the high priority network devices further may include determining a pattern number according to the formula: $pn_i=(cc_i \bmod pd_i)+1$; where $cc_i$=cycle counter; $pd_i$=pattern depth value; and $pn_i$=pattern number. The schedule allows each of the plurality of high priority network devices to transmit data when the $pn_i$th index of the sequence of bits of the $pd_i$ is equal to one. Create a schedule for transmission of the data by each of the plurality of low priority network devices and each of the plurality of high priority network devices further may include determine whether one of the plurality of low priority network devices may transmit the data when the amount of data transmitted during an iteration of the cycle counter is less than the maximum device transmission value and determine whether the network id value of the one of the plurality of low priority network devices is next in order in a round-robin sequence. Implementations of the described techniques may include hardware, a method or process, or computer software on a computer-accessible medium.

One general aspect includes a method for controlling data transmission on a network. The method also includes providing a network bus for transmitting the data on the network. The method also includes providing a plurality of low priority network devices and a plurality of high priority network devices where each of the plurality of low priority network devices and each of the plurality of high priority network devices are electrically connected to the network bus and where the data transmitted by the plurality of high priority network devices is of a higher priority to be transmitted than the data transmitted by the plurality of low priority network devices and where each of the plurality of low priority network devices and each of the plurality of high priority network devices have a network controller and where each network controller is programmed to: implement a cycle counter on each of the plurality of low priority network devices and each of the plurality of high priority network devices, implement a carrier sense multiple access with collision detection access method in each of the plurality of high priority network devices, assign a network id value to each of the plurality of low priority network devices, where the difference between each network id value of each of the plurality of low priority network devices is at least one to create a plurality of transmission gaps in which the plurality of low priority network devices may not transmit data, assign a plurality of network device parameters to each of the plurality of low priority network devices, and create a schedule for transmission of the data by each of the plurality of low priority network devices and each of the plurality of high priority network devices, where the schedule dictates whether each of the plurality of low priority network devices and each of the plurality of high priority network devices may transmit data, where the schedule allows each of the plurality of high priority network devices to transmit data based on the plurality of transmission gaps, and where the schedule allows each of the plurality of low priority network devices to transmit data based on the cycle counter and the plurality of network device parameters. Other embodiments of this aspect include corresponding computer systems, apparatus, and computer programs recorded on one or more computer storage devices, each configured to perform the actions of the methods.

Implementations may include one or more of the following features. The method where assign a plurality of network device parameters to each of the low priority network devices further may include assigning a modulo value. Assign a plurality of network device parameters to each of the low priority network devices further may include assigning an offset value. Create a schedule for transmission of the data by each of the plurality of low priority network devices and each of the plurality of high priority network devices further may include determining whether the following equation is true $(cc_i+o_i) \bmod m_i=0$ when creating the schedule for transmission of the data for each of the plurality of low priority network devices where: $cc_i$=cycle counter; $o_i$=offset value; and $m_i$=modulo value. Create a schedule for transmission of the data by each of the plurality of low priority network devices and each of the plurality of high priority network devices further may include selecting the values of $m_i$ and $o_i$ such that a predefined number of the plurality of low priority network devices are allowed to transmit data in a cycle. Assign a plurality of network device parameters to each of the low priority network devices further may include assigning a pattern depth value that is determined based on a sequence of bits. Assign a plurality of network device parameters to each of the low priority network devices further may include determining a pattern number according to the formula $pn_i=(cc_i \bmod pd_i)+1$; where $cc_i$=cycle counter; $pd_i$=pattern depth value; and $pn_i$=pattern number. The schedule allows each of the plurality of high priority network devices to transmit data when the $pn_i$th index of the sequence of bits of the $pd_i$ is equal to one. Create a schedule for transmission of the data by each of the plurality of low priority network devices and each of the plurality of high priority network devices further may include each of the plurality of high priority network devices using the carrier sense multiple access with collision detection access method to transmit during one of the plurality of transmission gaps. Implementations of the described techniques may include hardware, a method or process, or computer software on a computer-accessible medium.

One general aspect includes a system for controlling data transmission on a network. The system also includes a network bus for transmitting the data on the network. The system also includes a plurality of low priority network devices and a plurality of high priority network devices where each of the plurality of low priority network devices and each of the plurality of high priority network devices are electrically connected to the network bus and where the data transmitted by the plurality of high priority network devices is of a higher priority to be transmitted than the data transmitted by the plurality of low priority network devices and where each of the plurality of low priority network devices and each of the plurality of high priority network devices have a network controller and where each network controller is programmed to: implement a cycle counter on each of the plurality of low priority network devices and each of the plurality of high priority network devices, assign a network id value to each of the plurality of low priority network devices and each of the plurality of high priority network devices, assign a plurality of network device parameters having a modulo value and an offset value to each of the plurality of high priority network devices, receive a maximum device transmission value that dictates the combined number of the plurality of low priority network devices and the plurality of high priority network devices that may transmit data on the network bus during an iteration of the cycle counter, and create a schedule for transmission of the data by each of the plurality of network devices, where the schedule dictates whether each of the plurality of network devices may transmit data and where the schedule allows one of the plurality of low priority network devices to transmit the when the amount of data transmitted during an iteration of the cycle counter is less than the maximum device transmission value and when the network id value of the one of the plurality of low priority network devices is next in order in a round-robin sequence and where the schedule allows each of the plurality of high priority network devices to transmit data when the following equation is true $(cc_i+o_i) \bmod m_i=0$ where $cc_i$=cycle counter; $o_i$=offset value; and $m_i$=modulo value. Other embodiments of this aspect include corresponding computer systems, apparatus, and computer programs recorded on one or more computer storage devices, each configured to perform the actions of the methods.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a first table illustrating a first exemplary embodiment of transmission opportunities for the plurality of nodes relative to a local cycle counter using a modulo operation based schedule according to an exemplary embodiment;

FIG. 5 is a second table illustrating a second exemplary embodiment of transmission opportunities for the plurality of nodes relative to the local cycle counter using the modulo operation based schedule according to an exemplary embodiment;

FIG. 6 is a third table illustrating transmission opportunities for the plurality of nodes relative to the local cycle counter using a repeating pattern schedule according to an exemplary embodiment;

DETAILED DESCRIPTION

The following description is merely exemplary in nature and is not intended to limit the present disclosure, application, or uses.

Figure 1:
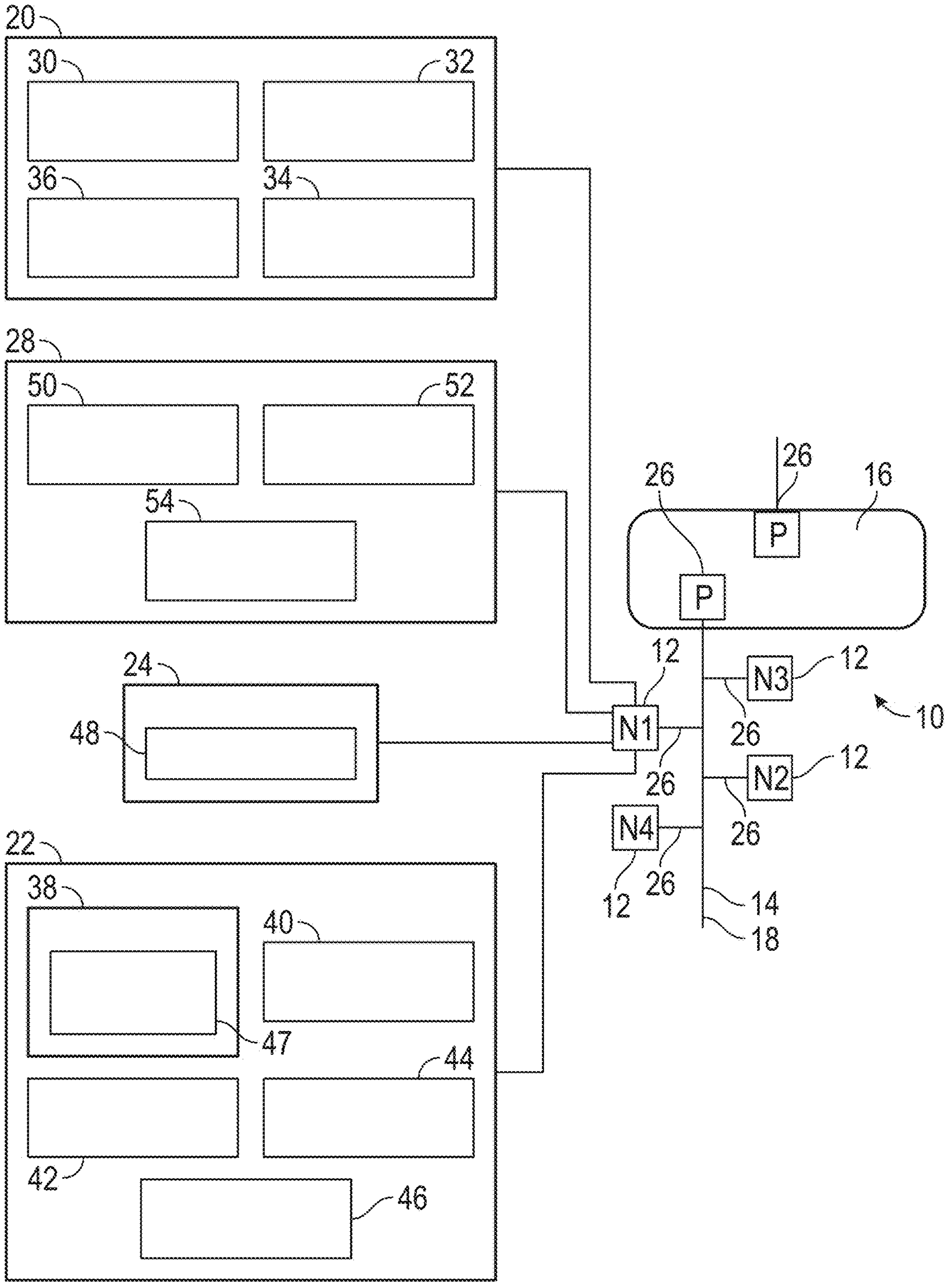
FIG. 1 is a schematic diagram of a network for scheduling a transmission opportunity for each of a plurality of nodes along a 10Base-T1S data bus according to an exemplary embodiment.

Referring to FIG. 1, a schematic diagram of a network 10 for scheduling a transmission opportunity for each of a plurality of nodes 12 along a 10Base-T1S data bus 14 is shown. The network 10 generally includes the 10Base-T1S data bus 14, the plurality of nodes 12, and an Ethernet switch 16.

The 10Base-T1S data bus 14 provides Ethernet communication using the IEEE 802.3cg-2019 Clause 147 physical layer (commonly referred to as 10Base-T1S) over a transmission medium 18 for the plurality of nodes 12. The 10Base-T1S data bus 14 enables the plurality of nodes 12 to utilize the 10Base-T1S data bus 14 to communicate between one another without the use of the Ethernet switch 16. The 10Base-T1S data bus 14 utilizes a frequency range of 1 Megahertz (MHz) to 20 MHz. The 10Base-T1S data bus 14 generally includes the transmission medium 18.

The transmission medium 18 is hardware that carries bi-directional Ethernet communication between the plurality of nodes 12, allowing for the plurality of nodes 12 to transmit and receive communications across the 10Base-T1S data bus 14. In a non-limiting example, the transmission medium 18 may be a twisted pair cable having a characteristic differential impedance of 100 ohms with a ±15% tolerance. The twisted pair cable has an insertion loss mask under 15 Decibels (dB) over the frequency range of the 10Base-T1S data bus 14, ensuring that the transmission medium 18 can carry 10 Megabits per second (Mbps) of data without the use of an error-correction algorithm to recover from errors in data caused by signal loss or signal reflection.

The plurality of nodes 12 are devices that may communicate data within an Ethernet frame across the 10Base-T1S data bus 14 to each other. In a non-limiting list of examples, each of the plurality of nodes 12 may be an engine control unit (ECU), infotainment controller, climate control module, sensor, actuator, programmable logic controller (PLC), motor controller, or human-machine interface (HMI) panel. It should be appreciated that the 10Base-T1S data bus 14 employs a multi-drop topology, allowing for the plurality of nodes 12 to have up to eight nodes in communication with one another along the 10Base-T1S data bus 14 when following the IEEE 802.3cg Clause 147 guidelines. Each of the plurality of nodes 12 includes a microcontroller 20, an Ethernet controller 22, a physical layer transceiver (PHY layer) 24, a connector interface 26, and a power supply 28.

The microcontroller 20 is a non-generalized, electronic control device having a preprogrammed digital computer or processor 30, a memory 32, a transceiver 34, and a plurality of input and output ports 36. The processor 30 may be a custom made or commercially available processor, a central processing unit (CPU), a graphics processing unit (GPU), an auxiliary processor among several processors associated with the microcontroller 20, a semiconductor-based microprocessor (in the form of a microchip or chip set), a microprocessor, a combination thereof, or generally a device for executing instructions. The memory 32 is used to store data such as control logic, software applications, instructions, computer code, data, lookup tables, etc. The memory 32 includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code. The processor 30 is configured to execute the code or instructions.

The transceiver 34 is configured to wirelessly communicate with a hotspot using Wi-Fi protocols under IEEE 802.11x standards. The transceiver 34 is also configured to wirelessly communicate using cellular data communication under GSMA standards, such as SGP.02, SGP.22, SGP.32 and the like. Suitably, the respective node from the plurality of nodes 12 may further include an embedded universal integrated circuit card (eUICC) configured to store at least one cellular connectivity configuration profile, for example, an embedded subscriber identity module (eSIM) profile. The transceiver 34 is further configured to communicate via a personal area network (e.g., BLUETOOTH), near-field communication (NFC), and/or any additional type of radiofrequency communication.

The plurality of input and output ports 36 may receive incoming data from at least one sensor of the respective node and communicate the incoming data to the processor. The plurality of input and output ports 36 also receive outgoing data from the processor 30 and communicate the outgoing data to the at least one sensor of the respective node. The plurality of input and output ports 36 are configured to wirelessly communicate with the at least one sensor of the respective node via the transceiver 34 or through a Universal Serial Bus (USB) wired connection.

The microcontroller 20 may further include one or more applications. The application is a software program configured to perform a specific function or set of functions. The applications may include one or more computer programs, software components, sets of instructions, procedures, functions, objects, classes, instances, related data, or a portion thereof adapted for implementation in a suitable computer readable program code. The applications may be stored within the memory 32 or in additional or separate memory.

The microcontroller 20 is in electrical communication with the at least one sensor of the respective node. In an exemplary embodiment, the electrical communication is established using, for example, a CAN network, a FLEXRAY network, a local area network (e.g., WiFi, Ethernet, and the like), a serial peripheral interface (SPI) network, or the like. It should be understood that various additional wired and wireless techniques and communication protocols for communicating with the microcontroller 20 are within the scope of the present disclosure. The microcontroller 20 is also in communication with the other nodes from the plurality of nodes 12 through the Ethernet-based communication provided by a media access control (MAC) layer 38 and a PHY layer 24 of each node from the plurality of nodes 12.

The Ethernet controller 22 is hardware manages the MAC layer 38, interfacing with the PHY layer 24 to transmit Ethernet frames across the 10Base-T1S data bus 14. The Ethernet controller 22 has address filtering logic that filters received Ethernet frames based on MAC address data within the Ethernet frame. The Ethernet controller 22 utilizes a host interface to communicate with the microcontroller 20 which, in a non-limiting list of examples, may be a serial peripheral interface (SPI), memory-mapped bus, parallel interface, or peripheral component interconnect express (PCIe). The Ethernet controller 22 receives and transmits Ethernet frames from and to the PHY layer 24 via, in a non-limiting list of examples, media independent interface (MII) or reduced media independent interface (RMII). The Ethernet controller 22 may have flow control logic using a pause frame, which allows the respective node to pause or slow down the received Ethernet frames from the other nodes of the plurality of nodes 12 to avoid buffer overflows, dropped Ethernet frames, or other congestion. The Ethernet controller 22 has the MAC layer 38, a transmit first-in, first-out (FIFO) buffer 40, a receive FIFO buffer 42, an interrupt controller 44, and a direct memory access (DMA) controller 46.

The MAC layer 38 is hardware that generates Ethernet frames holding a data payload generated by a software stored in the memory 32 and executed by the microcontroller 20, adds a respective Ethernet frame header to each received Ethernet frame, and forwards each received Ethernet frame to the PHY layer 24. The MAC layer 38 may also receive Ethernet frames from the PHY layer 24, where the MAC layer 38 then removes the respective Ethernet frame header from each received Ethernet frame and then communicates each received Ethernet frame to the PHY layer 24. The Ethernet frame header may include a preamble, start frame delimiter (SFD), destination MAC address, source MAC address, a type of data within the Ethernet frame, and a payload length of the Ethernet Frame. It should be appreciated that the MAC layer 38 may be within the microcontroller 20 in communication with the Ethernet controller 22 via, in a non-limiting list of examples, a SPI or PCIe. The MAC layer 38 has a CSMA-CD mechanism 47.

The CSMA-CD mechanism 47 implements a CSMA-CD access method of the network 10 as defined in IEEE 802.3 Clause 4 that allows for the plurality of nodes 12 to transmit Ethernet nodes across the transmission medium 18. The CSMA-CD access method enables each of the plurality of nodes 12 to listen to the transmission medium 18 using carrier sense to determine that another node from the plurality of nodes 12 is not already transmitting an Ethernet frame. When a node from the plurality of nodes 12 has an Ethernet frame to transmit and determines that no other node from the plurality of nodes 12 is transmitting, the node transmits the Ethernet frame across the transmission medium 18. When at least two of the plurality of nodes 12 transmit an Ethernet frame across the transmission medium 18 simultaneously, the transmitting nodes will temporarily terminate transmission and will wait for a random period of time before attempting to transmit an Ethernet frame across the transmission medium 18 again.

The transmit FIFO buffer 40 enables a buffered transfer of Ethernet frames from the MAC layer 38 to the PHY layer 24. The transmit FIFO buffer 40 allows for transmission scheduling of Ethernet frames coordinated by a physical layer collision avoidance (PLCA) sublayer 48 where the Ethernet frames are held until a transmission opportunity is signaled.

The receive FIFO buffer 42 enables the Ethernet controller 22 to temporarily store Ethernet frames received from the PHY layer 24 and decouple frame reception from an amount of time the processor 30 of the microcontroller 20 takes to read a data payload within an Ethernet frame. The receive FIFO buffer 42 ensures complete Ethernet frames can be held within the Ethernet controller 22 when communication between the Ethernet controller 22 and the microcontroller 20 becomes interrupted or unavailable.

The interrupt controller 44 is hardware that generates interrupt signals to notify the processor 30 of the microcontroller 20 of activity or status changes, including but not limited to Ethernet frame reception, Ethernet frame transmission completion, buffer overflows or underruns, link status changes, or detected errors. The interrupt controller 44 signals to the processor 30 using, in a non-limiting list of examples, a plurality of status registers or a plurality of event flags corresponding to a particular activity. The interrupt controller 44 may support interrupt masking and prioritization, allowing for the processor 30 to enable or disable either the plurality of status registers or the plurality of event flags corresponding to a particular activity.

The DMA controller 46 is optional hardware of the Ethernet controller 22 that allows the Ethernet controller 22 to autonomously transfer Ethernet frames between the transmit FIFO buffer 40, the receive FIFO buffer 42, and the memory 32 without activity by the processor 30. The DMA controller 46 may operate using a plurality of descriptors, which may define a source or destination address, transfer length, and control flags to instruct how the Ethernet frame transfer between the transmit FIFO buffer 40, the receive FIFO buffer 42, and the memory 32 should be performed. The DMA controller 46 may support burst transfers of Ethernet frames, allowing for multiple bytes of data to be transferred in a single and continuous operation.

The PHY layer 24 is hardware that converts Ethernet frames received from the MAC layer 38 via, in a non-limiting list of examples, MII or RMII, into analog electric signals for transmission across the transmission medium 18. The PHY layer 24 also converts analog signals received from the transmission medium 18 into Ethernet frames represented as digital bits for delivery to the MAC layer 38. The PHY layer 24 employs a multi-drop topology of the 10Base-T1S data bus, allowing the plurality of nodes 12 to share the same transmission medium 18. The PHY layer 24 supports half-duplex communication, meaning each of the plurality of nodes 12 are allocated their own transmission opportunity, coordinated by the PLCA sublayer 48. The PHY layer 24 ensures that each end of the transmission medium 18 is terminated with a resistance matching the impedance of the transmission medium 18 via, in a non-limiting list of examples, a programmable register within the PHY layer 24 or external passive resistors on the nodes of the plurality of nodes 12 situated at both ends of the 10Base-T1S data bus 14. The PHY layer 24 may have adaptive equalizers and signal shaping circuits for tuning the analog electrical signals the PHY layer 24 communicates to compensate for signal loss and signal reflection. The PHY layer 24 has the PLCA sublayer 48.

The PLCA sublayer 48 is hardware that coordinates when each of the plurality of nodes 12 has a transmission opportunity, meaning that the respective node may communicate an Ethernet frame across the 10Base-T1S data bus 14 per IEEE 802.3cg Clause 148. The PLCA sublayer 48 also assists in preventing data collisions between Ethernet frames communicated by different nodes. The PLCA sublayer 48 assists in preventing data collisions sending a beacon from a node from the plurality of nodes 12 with a node ID zero to the plurality of nodes 12 to initiate a communication cycle of the 10Base-T1S data bus 14 and providing a transmission opportunity for each of the plurality of nodes 12 to communicate an Ethernet frame across the 10Base-T1S data bus 14 in chronological order based on each respective node's node ID. It should be appreciated that each respective node's node ID may be configured during software configuration of the respective node, hardware strapping of the respective node, or through a management interface (such as a management data input/output (MDIO) commands standardized in IEEE 802.3 Clause 22/45 or SPI commands communicated to the PHY layer 24).

The connector interface 26 is a physical port of each of the plurality of nodes 12 that connects each of the plurality of nodes 12 to the transmission medium 18. In a non-limiting list of examples, the connector interface 26 may be a M12 X-Coded connector, a M12 D-Coded connector, a Fachkreis Automobil (FAKRA) connector, Japan Solderless Terminal (JST) connector, or Molex connector.

The power supply 28 provides electrical energy to each of the plurality of nodes 12, powering the components of each of the plurality of nodes 12 including the microcontroller 20, PHY layer 24, and MAC layer 38 of each respective node. The power supply 28 has an input power connector 50, a voltage regulator 52, and a plurality of capacitors 54. The input power connector 50 accepts electrical energy from an external power source (i.e. a battery, direct current (DC) rail, or a wall adapter) to be used to power the components of the respective node. In a non-limiting list of examples, the input power connector 50 may be a barrel jack, a JST connector, a screw terminal, a mini-fit connector, or a plurality of header pins. The voltage regulator 52 converts unregulated or high voltage electrical energy accepted by the input power connector 50 into stable or low voltage electrical energy to power the components of the respective node. In a non-limiting list of examples, the voltage regulator 52 may be a low dropout regulator (LDO) or a buck converter.

The plurality of capacitors 54 are made up of different types of capacitors perform a respective function in the powering of the respective node. In a non-limiting list of examples, the plurality of capacitors 54 may include a plurality of bypass capacitors, a plurality of bulk capacitors, a plurality of regulator stabilization capacitors, and a plurality of electromagnetic interference (EMI) capacitors. The plurality of bypass capacitors provides a local reservoir of charge for the components of the respective node and filters out high-frequency voltage fluctuations along an electric pathway of the power supply 28 that provides power to the components of the respective node. The plurality of bulk capacitors stores electrical energy and supplies the electrical energy to the components of the respective node during sudden load changes or current surges. The plurality of regulator stabilization capacitors maintains a voltage stability of the electrical energy moving through the electric pathway of the power supply 28 and prevents oscillation of the voltage regulator 52. The plurality of EMI capacitors filter high-frequency voltage fluctuations by diverting the high voltage fluctuations through the plurality of EMI capacitors and into a ground plane of the respective node.

The Ethernet switch 16 is a bridge that may be used to connect the 10Base-T1S data bus 14 to a larger Ethernet network for communication between the plurality of nodes 12 along the 10Base-T1S data bus 14 and the larger Ethernet network. In a non-limiting list of examples, the larger Ethernet network may include central electronic control units (ECUs), Time-Sensitive Networking (TSN) domains, external networks (i.e. cloud gateways and Internet of Things (IoT) interfaces), and other data buses using 100Base-TX, 100Base-T, 100Base-T1, or Ethernet/IP systems.

It should be appreciated that the network 10, as defined in IEEE 802.3cg Clause 147, may support a burst mode feature where an indicated node from the plurality of nodes 12 may transmit more than one Ethernet frame during a transmission opportunity within a preconfigured period of time. When the burst mode feature is enabled, the MAC layer 38 determines when Ethernet frames are to be transmitted from the transmit FIFO buffer 40 to the PHY layer 24, whether there are Ethernet frames available to transmit, and determines when the preconfigured period of time has been exceeded using a burst timer to halt the transmission of Ethernet frames. The PHY layer 24 monitors an elapsed time of a transmission opportunity, and will terminate the transmission opportunity when a preconfigured maximum duration of the transmission opportunity is exceeded. The DMA controller 46, when present, assists with rapidly loading Ethernet frames into the transmit FIFO buffer 40 to ensure the frequency of transmission of Ethernet frames while burst mode is enabled is sustained.

Figure 2:
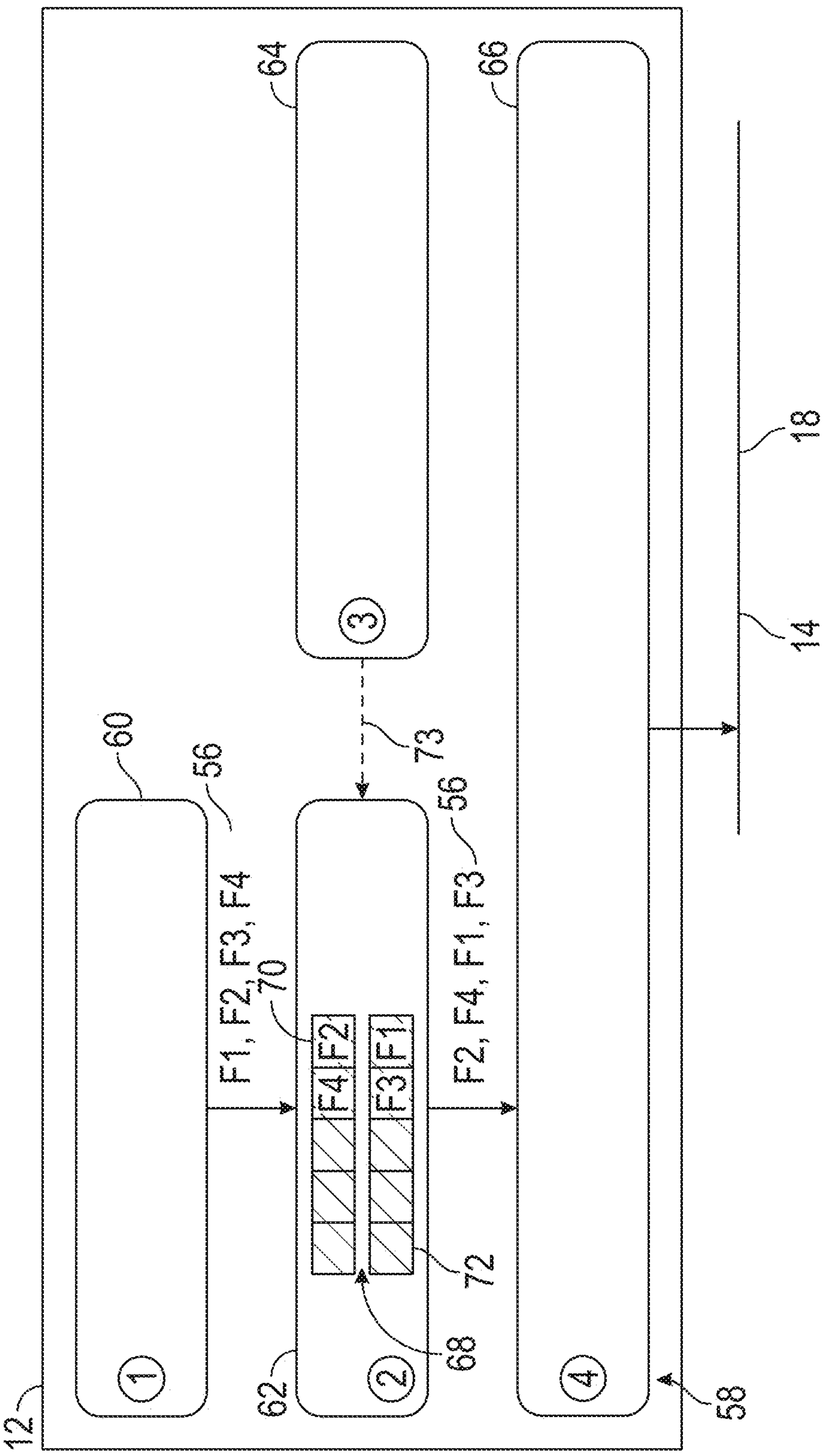
FIG. 2 is a flow diagram demonstrating a transmission sequence of a plurality of Ethernet frames from a respective node from the plurality of nodes across the 10Base-T1S data bus according to an exemplary embodiment.

Referring to FIG. 2, a flow diagram demonstrating a transmission sequence of a plurality of Ethernet frames 56 from a respective node from the plurality of nodes 12 across the 10Base-T1S data bus 14 is generally indicating using reference number 58. The flow diagram 58 has a functional software block 60, a queuing block 62, a scheduling block 64, and a transmission block 66.

The functional software block 60 is software stored in the memory 32 and executed by the microcontroller 20 that generates a respective data payload that will be loaded into each of the plurality of Ethernet frames 56. Each data payload is associated with a corresponding priority level (i.e. low latency or best-effort) as determined by the functional software block 60. In a non-limiting list of examples, each data payload may have data based on sensor data, control signals, or network service messages of the microcontroller 20. The data payload for each of the plurality of Ethernet frames 56 is then communicated to the MAC layer 38 once the respective node receives a transmission opportunity, where the MAC layer 38 generates and associates a respective MAC header for each data payload, formalizing the plurality of Ethernet frames 56. In the exemplary embodiment, an Ethernet frame having a low latency data payload is a low latency Ethernet frame and an Ethernet frame having a best-effort data payload is a best-effort Ethernet frame. It should be appreciated in another exemplary embodiment, there may be further priority levels of each of the plurality of Ethernet frames 56 besides low latency and best-effort (i.e. moderate latency). The plurality of Ethernet frames 56 are then communicated to the queuing block 62.

The queuing block 62 receives the plurality of Ethernet frames 56 from the functional software block 60 are organized and stored into a plurality of queues 68. The plurality of queues 68 have a corresponding priority designation, from highest priority to lowest priority, which determines which of the plurality of Ethernet frames 56 will be stored in each of the plurality of queues 68. In the exemplary embodiment, the plurality of queues 68 has a low latency queue 70 having the highest priority designation for storing Ethernet frames the functional software block 60 determined to be low latency Ethernet frames. The exemplary embodiment also has a best effort queue 72 having the lowest priority designation for storing Ethernet frames the functional software block 60 determined to be best-effort Ethernet frames. In another exemplary embodiment, the plurality of queues 68 has as many queues as there are priority levels for the plurality of Ethernet frames 56 where each queue has a corresponding priority designation from highest priority to lowest priority. It should be appreciated that when the plurality of queues 68 do not hold any of the plurality of Ethernet frames 56, the respective node refuses the transmission opportunity, as the respective node does not have an available Ethernet frame to transmit.

The plurality of Ethernet frames 56 are stored in the plurality of queues 68 until the transmission opportunity of the respective node is presented based on the order of the node IDs in the given communication cycle and whether the respective node is permitted to transmit an Ethernet frame during the given communication cycle based on the scheduling block 64. When the respective node is permitted to transmit, an Ethernet frame in a top index of the queue from the plurality of queues 68 having a highest available priority designation is transferred to the PHY layer 24. The transmission of the Ethernet frame across the transmission medium 18 is then executed by the transmission block 66.

stored in the plurality of queues 68 until the transmission opportunity of the respective node is presented based on the order of the node IDs in the given communication cycle and whether the respective node is permitted to transmit an Ethernet frame during the given communication cycle based on the scheduling block 64

It should be further appreciated that the network 10, as defined in IEEE 802.1Q Clause 8.6.8.4, may support a credit-based traffic shaping (CBTS) feature that uses a credit counter in each of the plurality of queues 68 to regulate when each of the plurality of nodes 12 may transmit Ethernet frames. When the CBTS feature is enabled, the credit counter in a respective queue from the plurality of queues 68 accumulates at a preconfigured idle rate when the respective node is not transmitting an Ethernet node across the transmission medium 18. When the respective node has a transmission opportunity and the credit counter of the respective queue has a value greater than zero, the respective node transmits Ethernet frames within the respective queue to the PHY layer 24 and then to the transmission medium 18 while also decreasing the value of the credit counter at a preconfigured send rate. When the credit counter falls to or below zero, the respective node terminates transmission of Ethernet frames until the respective node has another transmission opportunity and the value of the credit counter reaccumulates above zero.

The scheduling block 64 determines when a transmission opportunity for the respective node arises. The scheduling block 64 may use one of a plurality of scheduling methods to determine when a transmission opportunity for the respective node arises based on latency requirements for the plurality of Ethernet frames determined by a designer of the network 10. The plurality of scheduling methods include a modulo operation based schedule, a repeating pattern schedule, a dynamic slot filling schedule, and a dynamic CSMA-CD slot filling schedule (described in further detail below).

The scheduling block 64 communicates a trigger signal 73 to the queuing block 62 that initiates the process of determining which of the plurality of Ethernet frames 56 from the plurality of queues 68 will be communicated to the transmission block 66 to be transmitted across the transmission medium 18 as late as possible (hereinafter the late commit principle). The late commit principle allows the respective node to determine which of the plurality of Ethernet frames 56 is the best to be transmitted considering the functional software block 60 continuously and asynchronously communicates Ethernet frames to the queuing block 62. It should be appreciated that the late commit principle should assist the queuing block 62 in selecting and preparing a best Ethernet frame to be transmitted to the transmission block 66 while also ensuring that the transmission opportunity is not missed because a best Ethernet frame has not been determined.

The transmission block 66 is a functionality of the MAC layer 38 and PHY layer 24 that prepares and transmits the plurality of Ethernet frames 56 across the transmission medium 18 to be received by the other nodes in the plurality of nodes 12. After the respective node receives a transmission opportunity from the scheduling block 64, the MAC layer 38 communicates the Ethernet frame loaded into the transmit FIFO buffer 40 to the PHY layer 24 via, in a non-limiting list of examples, MII or RMII. The PHY layer 24 then encodes the Ethernet frame into a physical signaling format suitable for 10Base-T1S for transmission across the transmission medium 18. In a non-limiting list of examples, the physical signaling format used for transmission across the transmission medium 18 is Pulse Amplitude Modulation with three levels (PAM3).

It should be appreciated that there are different configurations in which the queuing block 62 and the scheduling block 64 may be implemented between the software stored in the memory 32 and executed by the microcontroller 20 and the hardware components of the 10Base-T1S data bus 14, MAC layer 38, and PHY layer 24. In a non-limiting exemplary embodiment, the queuing block 62 may be a location in memory 32 when implemented in the software executed by the microcontroller 20 and may be in a plurality of buffers when implemented in the hardware components of the MAC layer 38. In a non-limiting exemplary embodiment, the scheduling block 64 may be implemented in the software executed by the microcontroller 20 when a bit of a hardware register indicates the initiating of a communication cycle that may be cleared by using the software to write to the bit or by using the software to generate an interrupt that is associated with an interrupt generated by the interrupt controller 44. In a non-limiting exemplary embodiment, the scheduling block 64 may be implemented in the PLCA sublayer 48 when implemented in the hardware components of the PHY layer 24. Depending on the embodiment, the queuing block 62 and scheduling block 64 may both be implemented in the software executed by the microcontroller 20 or may both be implemented in the hardware components of the 10Base-T1S data bus 14, MAC layer 38, and PHY layer 24. Depending on the embodiment, the queuing block 62 may also be implemented in the software executed by the microcontroller 20 when the scheduling block 64 is implemented in the hardware components of the 10Base-T1S data bus 14, MAC layer 38, and PHY layer 24 or vice versa. It should also be appreciated that the functional software block 60 is always implemented in the software executed by the microcontroller 20 and the transmission block 66 is always implemented in the PHY layer 24, the PLCA sublayer, and the transmission medium 18.

In the exemplary embodiment where either the queuing block 62 or the scheduling block 64 are implemented in the software executed by the microcontroller 20, the hardware of the 10Base-T1S data bus 14, MAC layer 38, or PHY layer 24 has a functionality to notify the microcontroller 20 when a beacon is transmitted across the 10Base-T1S data bus 14. In the exemplary embodiment where the scheduling block 64 is implemented in the hardware components of the 10Base-T1S data bus 14, MAC layer 38, and PHY layer 24, the scheduling method implemented from the plurality of scheduling methods is implemented in discrete logic of the hardware components are only simple operations (e.g., modulo operators, increment operators, compare operators, etc.).

Figure 3:
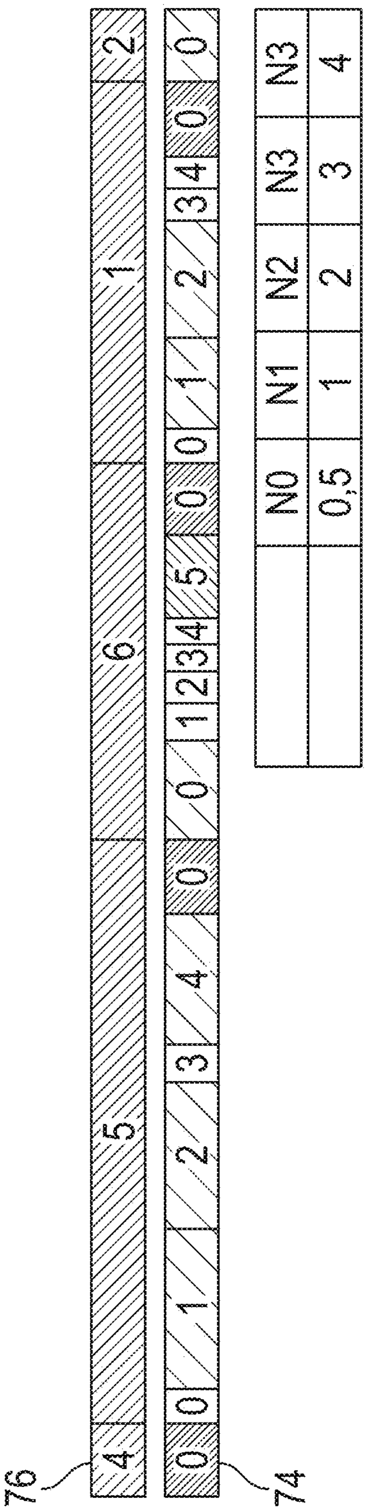
FIG. 3 is a diagram of a plurality of communication cycles of the plurality of nodes across the 10Base-T1S data bus according to an exemplary embodiment.

Referring to FIG. 3, a diagram of a plurality of communication cycles 74 of the plurality of nodes 12 across the 10Base-T1S data bus 14 is shown. Each communication cycle of the 10Base-T1S data bus 14 occurs when each of the plurality of nodes 12 has had a transmission opportunity to communicate an Ethernet frame across the 10Base-T1S data bus 14 to the other nodes in the plurality of nodes 12. Each communication cycle of the 10Base-T1S data bus 14 is initiated when a beacon from a node from the plurality of nodes 12 with a node ID zero is communicated to the plurality of nodes 12 across the transmission medium 18. It should be appreciated that 10Base-T1S has a multi-ID feature where at least one of the plurality of nodes 12 may have more than one node ID. In the exemplary embodiment, the plurality of nodes 12 has five nodes, with a node ID zero, one, two, three, and four respectively. It should be appreciated that in the exemplary embodiment, the node from the plurality of nodes 12 with the node ID zero also has a node ID five due to the multi-ID feature. The multi-ID feature allows the node with the node ID zero and five to transmit the beacon across the transmission medium 18 to the plurality of nodes 12 and to afford two transmission opportunities to transmit an Ethernet frame across the transmission medium 18 to the plurality of nodes 12 in one communication cycle.

Each of the plurality of nodes 12 has a local cycle counter 76 for tracking the plurality of communication cycles 74. The local cycle counter 76 is a counter within each of the plurality of nodes 12 that tracks the number of communication cycles a respective node has participated in. The local cycle counter 76 is initialized to zero and is incremented by a value of one each time a respective node receives a beacon from the node with the node ID zero. It should be appreciated that nodes from the plurality of nodes 12 may be enabled or disabled after the first communication cycle has been initiated. It should also be appreciated that in the exemplary embodiment, the local cycle counter 76 is illustrated as a single local cycle counter despite each of the plurality of nodes 12 having a respective local cycle counter as the local cycle counter 76 in each of the enabled plurality of nodes 12 is equal to one another.

A node from the plurality of nodes 12 may also have to be reset after the first communication cycle has been initiated. Node ID zero, using the multi-ID feature of 10Base-T1S to transmit under a different node ID, may periodically transmit a reset request across the transmission medium 18 to enabled nodes of the plurality of nodes 12. The reset request indicates to the node with node ID zero to communicate to the enabled nodes of the plurality of nodes 12 to reset their respective local cycle counter to a value of zero. The reset request allows the local cycle counter of each of the plurality of nodes 12 that have been enabled or have had the respective processor 30 reset after the first communication cycle has been initiated to be synchronized with each local cycle counter of each of the plurality of nodes 12 that are enabled. It should be appreciated that each cell of the plurality of communication cycles 74 having a value corresponds to a node ID of a node from the plurality of nodes 12 that has a transmission opportunity during the communication cycle tracked by the local cycle counter 76.

In the exemplary embodiment, the local cycle counter 76 in each of the plurality of nodes starts at a value of four, indicating that the plurality of nodes 12 have each had four transmission opportunities since the initialization of the local cycle counter 76. The node with the node ID zero then transmits a beacon across the transmission medium 18 to the plurality of nodes 12, incrementing the local cycle counter 76 in each of the plurality of nodes 12 to a value of five, initiating the fifth communication cycle. The fifth communication cycle is executed, where the nodes with a node ID one, two, and four respectively transmit an Ethernet frame across the transmission medium 18 and the nodes with a node ID zero and three refuse their transmission opportunities. The fifth communication cycle then concludes, where the node with a node ID zero sends a beacon and the local cycle counter 76 within each node increments by one to a value of six and the sixth communication cycle is initiated.

The sixth communication cycle is executed similarly to the fifth communication cycle, where some of the plurality of nodes 12 transmit an Ethernet frame across the transmission medium 18 during a transmission opportunity of the respective node and some of the plurality of nodes 12 refuse their transmission opportunity. In the exemplary embodiment, the multi-ID feature of 10Base-T1S is enabled in the node with a node ID zero during the sixth communication cycle, allowing the node with a node ID zero to also have a transmission opportunity under a node ID five. When the node with the node ID zero has a transmission opportunity under the node ID five, node ID five will transmit across the transmission medium 18, indicating a reset request to the enabled plurality of nodes 12, causing the local cycle counter of each of the plurality of nodes 12 to be reset to a value of zero. When node ID zero communicates another beacon, the local cycle counter 76 is incremented by a value of one and a first communication cycle is initiated, followed by a second communication cycle.

It should be appreciated that in another exemplary embodiment, the local cycle counter 76 may be incremented up to a value of 100 while node ID zero does receive a reset request from any of the plurality of nodes 12. After the value of the local cycle counter 76 reaches 100, once a following communication cycle is initiated, the local cycle counter 76 of each of the enabled plurality of nodes 12 is reset to a value of one. It should also be appreciated that in another exemplary embodiment, the frequency of node ID zero utilizing the multi-ID feature of 10Base-T1S to transmit a reset request under another node ID may occur as often as after the completion of one communication cycle or may never occur throughout all 100 communication cycles that can be tracked using the local cycle counter 76.

Referring to FIG. 4, a first table 78 illustrating a first exemplary embodiment of transmission opportunities for the plurality of nodes 12 relative to the local cycle counter 76 using the modulo operation based schedule is shown. Each of the columns of the first table 78 represent the plurality of nodes 12 and each of the rows of the first table 78 represent the value of the local cycle counter 76 incrementally from the top of the first table 78 to the bottom of the first table 78.

The modulo operation based schedule is configured in the scheduling block 64 and allows the plurality of nodes 12 that transmit only low latency, higher priority Ethernet frames or transmit a combination of low latency Ethernet frames and best-effort Ethernet frames (hereinafter low latency nodes) to have a transmission opportunity for every communication cycle of the 10Base-T1S data bus 14 while limiting transmission opportunities of the plurality of nodes 12 that transmit only best-effort, lower priority Ethernet frames (hereinafter best-effort nodes) for every communication cycle. The feature of the modulo operation based schedule limiting transmission opportunities of best-effort nodes reduces worst-case latency for transmission by low latency nodes by reducing the number of nodes that have a transmission opportunity each communication cycle, allowing for shorter communication cycles and more frequent transmission opportunities for each low latency node. The modulo operation based schedule receives a set of modulo operation pluralities of network device parameters 80 to assist in determining whether a node from the plurality of nodes 12 has a transmission opportunity during a communication cycle.

The set of modulo operation pluralities of network device parameters 80 are parameters configured within the functional software block 60 and indicate to the scheduling block 64 whether each of the plurality of nodes 12 the priority level of each of the plurality of nodes 12 (e.g., low latency and best-effort). Each plurality of network device parameters within the set of modulo operation pluralities of network device parameters 80 correspond with an individual node from the plurality of nodes 12. Each plurality of network device parameters has a modulo value ($m_i$) and an offset value ($o_i$).

The modulo operation based schedule determines that one of the plurality of nodes 12 should receive a transmission opportunity during a given communication cycle by receiving and inputting a corresponding plurality of network device parameters from the set of modulo operation pluralities of network device parameters 80 and the local cycle counter 76 into a modulo operation equation $(cc_i+o_i) \bmod m_i=0$. It should be appreciated that $cc_i$ represents the value of the local cycle counter 76 during the given communication cycle and $m_i$ and $o_i$ are a plurality of network device parameters from the set of modulo operation pluralities of network device parameters 80 corresponding to the one of the plurality of nodes. When the modulo operation equation is true, the modulo operation based schedule determines the one of the plurality of nodes 12 corresponding to the inputted plurality of network device parameters has a transmission opportunity during the given communication cycle. When the modulo operation equation is false, the modulo operation based schedule determines that the one of the plurality of nodes 12 corresponding to the inputted plurality of network device paraments does not have a transmission opportunity during the given communication cycle.

In the first exemplary embodiment, the plurality of nodes 12 has six nodes and the set of modulo operation pluralities of network device parameters 80 has a plurality of network device parameters $m_i=1$, $o_i=0$ corresponding to node ID zero and node ID one, $m_i=4$, $o_i=3$ corresponding to node ID two, $m_i=4$, $o_i=2$ corresponding to node ID three, $m_i=4$, $o_i=1$ corresponding to node ID four, and $m_i=4$, $o_i=0$ corresponding to node ID five. It should be appreciated that the configuration of the set of modulo operation pluralities of network device parameters 80 indicates that node ID zero and node ID one are low latency nodes and node ID two, node ID three, node ID four, and node ID five are best-effort nodes.

In the first exemplary embodiment, after inputting the corresponding plurality of network device parameters into the modulo operation equation, when the local cycle counter 76 has a value of one, node ID zero, node ID one, and node ID two have a transmission opportunity (represented by an "X" within the corresponding cell of the first table 78). When the local cycle counter 76 has a value of two, node ID zero, node ID one, and node ID three have a transmission opportunity. When the local cycle counter 76 has a value of three, node ID zero, node ID one, and node ID four have a transmission opportunity. When the local cycle counter 76 has a value of four, node ID zero, node ID one, and node ID five have a transmission opportunity. The pattern of the communication cycles then repeat, where the low latency nodes have a transmission opportunity every communication cycle and the best-effort nodes have a transmission opportunity every fourth communication cycle.

It should be appreciated that in an alternative exemplary embodiment, the configuration of the set of modulo operation pluralities of network device parameters 80 may indicate that there are as many as eight low latency nodes and that there are as many as eight best-effort nodes, as long as there are no more than eight nodes in the plurality of nodes 12. In another alternative exemplary embodiment, when the IEEE 802.3cg Clause 147 guidelines are not followed, the plurality of nodes 12 may have more than eight nodes, meaning there may be more than eight low latency nodes and more than eight best-effort nodes. It should also be appreciated that while the configuration of the set of modulo operation pluralities of network device parameters 80 in the first exemplary embodiment limits the number of the plurality of nodes 12 that may have a transmission opportunity in the given communication cycle to three, in an alternative embodiment, the configuration of the set of modulo operation pluralities of network device parameters 80 may allow up to all enabled nodes from the plurality of nodes 12 to have a transmission opportunity in the given communication cycle. It should be further appreciated that while the configuration of the set of modulo operation pluralities of network device parameters 80 in the first exemplary embodiment treats each best-effort node fairly, allowing each best-effort node a transmission opportunity every fourth communication cycle, in an alternative exemplary embodiment, the configuration of the set of modulo operation pluralities of network device parameters 80 may allow for more transmission opportunities for particular best-effort nodes than for other best-effort nodes over the same amount of communication cycles.

Referring to FIG. 5, a second table 82 illustrating a second exemplary embodiment of transmission opportunities for the plurality of nodes 12 relative to the local cycle counter 76 using the modulo operation based schedule is shown. Each of the columns of the second table 82 represent the plurality of nodes 12 and each of the rows of the second table 82 represent the value of the local cycle counter 76 incrementally from the top of the second table 82 to the bottom of the second table 82. In the second exemplary embodiment, the modulo operation based schedule receives the set of modulo operation pluralities of network device parameters 80 to assist in determining whether a node from the plurality of nodes 12 has a transmission opportunity during a given communication cycle. It should be appreciated that in the second exemplary embodiment, each of the modulo operation pluralities of network device parameters from the set of modulo operation pluralities of network device parameters 80 have different value configurations for $m_i$ and $o_i$ compared to the first exemplary embodiment.

In the second exemplary embodiment, the plurality of nodes 12 has six nodes and the set of modulo operation pluralities of network device parameters 80 has a plurality of network device parameters $m_i=1$, $o_i=0$ corresponding to node ID zero, $m_i=2$, $o_i=1$ corresponding to node ID one, $m_i=4$, $o_i=3$ corresponding to node ID two, $m_i=2$, $o_i=0$ corresponding to node ID three, $m_i=2$, $o_i=0$ corresponding to node ID four, and $m_i=4$, $o_i=1$ corresponding to node ID five. It should be appreciated that the configuration of the set of modulo operation pluralities of network device parameters 80 indicates that node ID zero is a low latency node, node ID one, node ID three, and node ID four are moderate latency nodes, and node ID two and node ID five are best-effort nodes.

In the second exemplary embodiment, after inputting the corresponding plurality of network device parameters into the modulo operation equation, when the local cycle counter 76 has a value of one, node ID zero, node ID one, and node ID two have a transmission opportunity (represented by an "X" within the corresponding cell of the second table 82). When the local cycle counter 76 has a value of two, node ID zero, node ID three, and node ID four have a transmission opportunity. When the local cycle counter 76 has a value of three, node ID zero, node ID one, and node ID five have a transmission opportunity. When the local cycle counter 76 has a value of four, node ID zero, node ID three, and node ID four have a transmission opportunity. The pattern of the communication cycles then repeat, where the low latency node has a transmission opportunity every communication cycle, the moderate latency nodes have a transmission opportunity every other communication cycle, and each of the best-effort nodes have a transmission opportunity every fourth communication cycle.

It should be appreciated that in an alternative exemplary embodiment, when following the IEEE 802.3cg Clause 147 guidelines, the configuration of the set of modulo operation pluralities of network device parameters 80 may indicate that there are as many as eight low latency nodes, that there are as many as eight moderate latency nodes, and that there are as many as eight best-effort nodes, as long as there are no more than eight nodes in the plurality of nodes 12. In another alternative exemplary embodiment, when the IEEE 802.3cg Clause 147 guidelines are not followed, the plurality of nodes 12 may have more than eight nodes, meaning there may be more than eight low latency nodes, more than eight moderate latency nodes, and more than eight best-effort nodes. It should also be appreciated that while the configuration of the set of modulo operation pluralities of network device parameters 80 in the second exemplary embodiment limits the number of the plurality of nodes 12 that may have a transmission opportunity in the given communication cycle to three, in an alternative embodiment, the configuration of the set of modulo operation pluralities of network device parameters 80 may allow up to all enabled nodes from the plurality of nodes 12 to have a transmission opportunity in the given communication cycle.

It should be further appreciated that while the configuration of the set of modulo operation pluralities of network device parameters 80 in the second exemplary embodiment treats each moderate latency node and each best-effort node fairly, allowing each moderate latency node a transmission opportunity every other communication cycle and each best-effort node a transmission opportunity every fourth communication cycle, in an alternative exemplary embodiment, the configuration of the set of modulo operation pluralities of network device parameters 80 may allow for more transmission opportunities for particular moderate latency nodes and best-effort nodes than for other moderate latency nodes and best-effort nodes respectively over the same amount of communication cycles. It should be appreciated that while in the second exemplary embodiment, there are three classifications of nodes (low latency, moderate latency, and best-effort), in an alternative exemplary embodiment, there may be more or fewer classifications of nodes corresponding to the priority levels of data payloads determined in the functional software block 60.

In an alternative exemplary embodiment where the burst mode feature of 10Base-T1S is enabled, the modulo operation based schedule also initializes a burst limit integer for each of the plurality of nodes 12 to a preconfigured value received from the functional software block 60. The burst limit integer is a value that defines the number of Ethernet frames a respective node from the plurality of nodes 12 may transmit during the transmission opportunity of the respective node. It should be appreciated that enabling the burst mode feature while the modulo operation based schedule is scheduling transmission opportunities for the plurality of nodes 12 does not preclude any of the nodes scheduled to have a transmission opportunity during a given communication cycle from the transmission opportunity.

In an alternative exemplary embodiment where the CBTS of 10Base-T1S is enabled, the modulo operation based schedule may increase the value of the credit counter or decrease the value of the credit counter at the initiation of a communication cycle based on, in a non-limiting list of examples, the number of Ethernet frames transmitted or the cumulative size of the data payloads of the Ethernet frames transmitted from the respective queue corresponding to the credit counter.

Referring to FIG. 6, a third table 84 illustrating an exemplary embodiment of transmission opportunities for the plurality of nodes 12 relative to the local cycle counter 76 using the repeating pattern schedule is shown. The third table 84 has three large columns that represent the plurality of nodes 12. Each large column has a modulo column 86, which illustrates the result of a modulo operation of a repeating pattern equation, and a transmit column 88, which indicates whether a respective node from the plurality of nodes 12 has a transmission opportunity during a given communication cycle. Each of the rows of the third table 84 represent the value of the local cycle counter 76 incrementally from the top of the third table 84 to the bottom of the third table 84.

The repeating pattern schedule is configured in the scheduling block 64 and allows low latency nodes to have a transmission opportunity for every communication cycle of the 10Base-T1S data bus 14 while limiting transmission opportunities of best-effort nodes for every communication cycle. The feature of the repeating pattern schedule limiting transmission opportunities of best-effort nodes reduces worst-case latency for transmission by low latency nodes by reducing the number of nodes that have a transmission opportunity each communication cycle, allowing for shorter communication cycles and more frequent transmission opportunities for each low latency node. The repeating pattern schedule receives a set of repeating pattern pluralities of network device parameters 90 to assist in determining whether a node from the plurality of nodes 12 has a transmission opportunity during a communication cycle.

The set of repeating pattern pluralities of network device parameters 90 are parameters configured within the functional software block 60 and indicate to the scheduling block 64 the priority level of each of the plurality of nodes 12 (e.g., low latency and best-effort). Each plurality of network device parameters within the set of modulo operation pluralities of network device parameters 80 correspond with an individual node from the plurality of nodes 12. Each repeating pattern plurality of network device parameters has a pattern depth configuration parameter ($pd_i$) which indicates a number of communication cycles that are executed before a pattern of transmission opportunities for the individual node from the plurality of nodes 12 repeats. Each repeating pattern plurality of network device parameters also has a bit sequence of $pd_i$ bits, which are represented as integers stored separate within individual indices (i.e. (0, 0, 1)). It should be appreciated that the number of individual indices of the bit sequence of $pd_i$ bits is equal to the value of the $pd_i$ (i.e. when $pd_i$ is equal to three, the bit sequence of $pd_i$ bits has three individual indices). It should also be appreciated that in an alternative exemplary embodiment, the bit sequence of $pd_i$ bits, in a non-limiting list of examples, may be represented as a bit field, floats, doubles, or other data types.

The repeating pattern schedule determines that one of the plurality of nodes 12 should receive a transmission opportunity during a given communication cycle by receiving and inputting a corresponding plurality of repeating pattern network device parameters from the set of repeating pattern pluralities of network device parameters 90 and the local cycle counter 76 into the repeating pattern equation $(cc_i \bmod pd_i)+1=pn_i$. It should be appreciated that $cc_i$ represents the value of the local cycle counter 76 during the given communication cycle and $pn_i$ represents a pattern number which corresponds to an index of a corresponding bit sequence of $pd_i$ bits of the individual node from the plurality of nodes 12. When the $pn_i$th index of the bit sequence of $pd_i$ bits is equal to one, the repeating pattern schedule determines that the one of the plurality of nodes 12 corresponding to the inputted repeated pattern plurality of network device parameters has a transmission opportunity during the given communication cycle. When the $pn_i$th index of the bit sequence of $pd_i$ bits is not equal to one, the repeated pattern schedule determines the one of the plurality of nodes 12 corresponding to the inputted repeating pattern plurality of network device paraments does not have a transmission opportunity during the given communication cycle.

In the exemplary embodiment, the plurality of nodes 12 has three nodes and the set of repeating pattern pluralities of network device parameters 90 has a repeating pattern plurality of network device parameters $pd_i=1$, bit sequence of $pd_i$ bits represented as (1) corresponding to node ID zero, $pd_i=3$, bit sequence of $pd_i$ bits represented as (1, 1, 0) corresponding to node ID one, and $pd_i=3$, bit sequence of $pd_i$ bits represented as (0, 0, 1) corresponding to node ID two. It should be appreciated that the configuration of the set of modulo operation pluralities of network device parameters 80 indicates that node ID zero is a low latency node, node ID one is a moderate latency node, and node ID two is a best-effort node.

In the exemplary embodiment, after inputting the corresponding repeating pattern plurality of network device parameters into the repeating pattern equation, when the local cycle counter 76 has a value of zero, the $pn_i$ of node ID zero, node ID one, and node ID two is one, one, and one respectively. The $pn_i$th index of the bit sequence of $pd_i$ bits corresponding with each of the plurality of nodes 12, being the first index of the bit sequence of $pd_i$ bits for node ID zero, node ID one, and node ID two, is one, one, and zero respectively. Since the $pn_i$th index of the bit sequence of $pd_i$ bits corresponding with node ID zero and node ID one is equal to one, node ID zero and node ID one have a transmission opportunity (represented by an "X" within the corresponding cell of the third table 84) during the communication cycle where the local cycle counter 76 has a value of one.

When the local cycle counter 76 has a value of one, the $pn_i$ of node ID zero, node ID one, and node ID two is one, two, and two respectively. The $pn_i$th index of the bit sequence of $pd_i$ bits corresponding with each of the plurality of nodes 12, being the first index of the bit sequence of $pd_i$ bits for node ID zero, node ID one, and node ID two, is one, one, and zero respectively. Since the $pn_i$th index of the bit sequence of $pd_i$ bits corresponding with node ID zero and node ID one is equal to one, node ID zero and node ID one have a transmission opportunity. When the local cycle counter 76 has a value of two, the $pn_i$ of node ID zero, node ID one, and node ID two is one, three, and three respectively. The $pn_i$th index of the bit sequence of $pd_i$ bits corresponding with each of the plurality of nodes 12, being the first index of the bit sequence of $pd_i$ bits for node ID zero, node ID one, and node ID two, is one, zero, and one respectively. Since the $pn_i$th index of the bit sequence of $pd_i$ bits corresponding with node ID zero and node ID two is equal to one, node ID zero and node ID two have a transmission opportunity. The pattern of the communication cycles then repeat, where node ID zero has a transmission opportunity every communication cycle, node ID one has two consecutive transmission opportunities two out of every three communication cycles, and node ID two has a transmission opportunity every third communication cycle.

It should be appreciated that in an alternative exemplary embodiment, when following the IEEE 802.3cg Clause 147 guidelines, the configuration of the set of repeating pattern pluralities of network device parameters 90 may indicate that there are as many as eight low latency nodes, that there are as many as eight moderate latency nodes, and that there are as many as eight best-effort nodes, as long as there are no more than eight nodes in the plurality of nodes 12. In another alternative exemplary embodiment, when the IEEE 802.3cg Clause 147 guidelines are not followed, the plurality of nodes 12 may have more than eight nodes, meaning there may be more than eight low latency nodes, more than eight moderate latency nodes, and more than eight best-effort nodes. It should also be appreciated that while the configuration of the set of repeating pattern pluralities of network device parameters 90 in the exemplary embodiment limits the number of the plurality of nodes 12 that may have a transmission opportunity in the given communication cycle to two, in an alternative embodiment, the configuration of the set of repeating pattern pluralities of network device parameters 90 may allow up to all enabled nodes from the plurality of nodes 12 to have a transmission opportunity in the given communication cycle.

It should be further appreciated that in an alternative exemplary embodiment where there are more than three nodes in the plurality of nodes 12, the configuration of the set of repeating pattern pluralities of network device parameters 90 may allow for more transmission opportunities for particular moderate latency nodes and best-effort nodes than for other moderate latency nodes and best-effort nodes respectively over the same amount of communication cycles. It should be appreciated that while in the exemplary embodiment, there are three classifications of nodes (low latency, moderate latency, and best-effort), in an alternative exemplary embodiment, there may be more or fewer classifications of nodes corresponding to the priority levels of data payloads determined in the functional software block 60.

In an alternative exemplary embodiment where the burst mode feature of 10Base-T1S is enabled, the repeating pattern schedule also initializes the burst limit integer for each of the plurality of nodes 12 to a preconfigured value received from the functional software block 60. It should be appreciated that enabling the burst mode feature while the repeating pattern schedule is scheduling transmission opportunities for the plurality of nodes 12 does not preclude any of the nodes scheduled to have a transmission opportunity during a given communication cycle from the transmission opportunity.

In an alternative exemplary embodiment where the CBTS of 10Base-T1S is enabled, the repeating pattern schedule may increase the value of the credit counter or decrease the value of the credit counter at the initiation of a communication cycle based on, in a non-limiting list of examples, the number of Ethernet frames transmitted or the cumulative size of the data payloads of the Ethernet frames transmitted from the respective queue corresponding to the credit counter.

Figure 7:
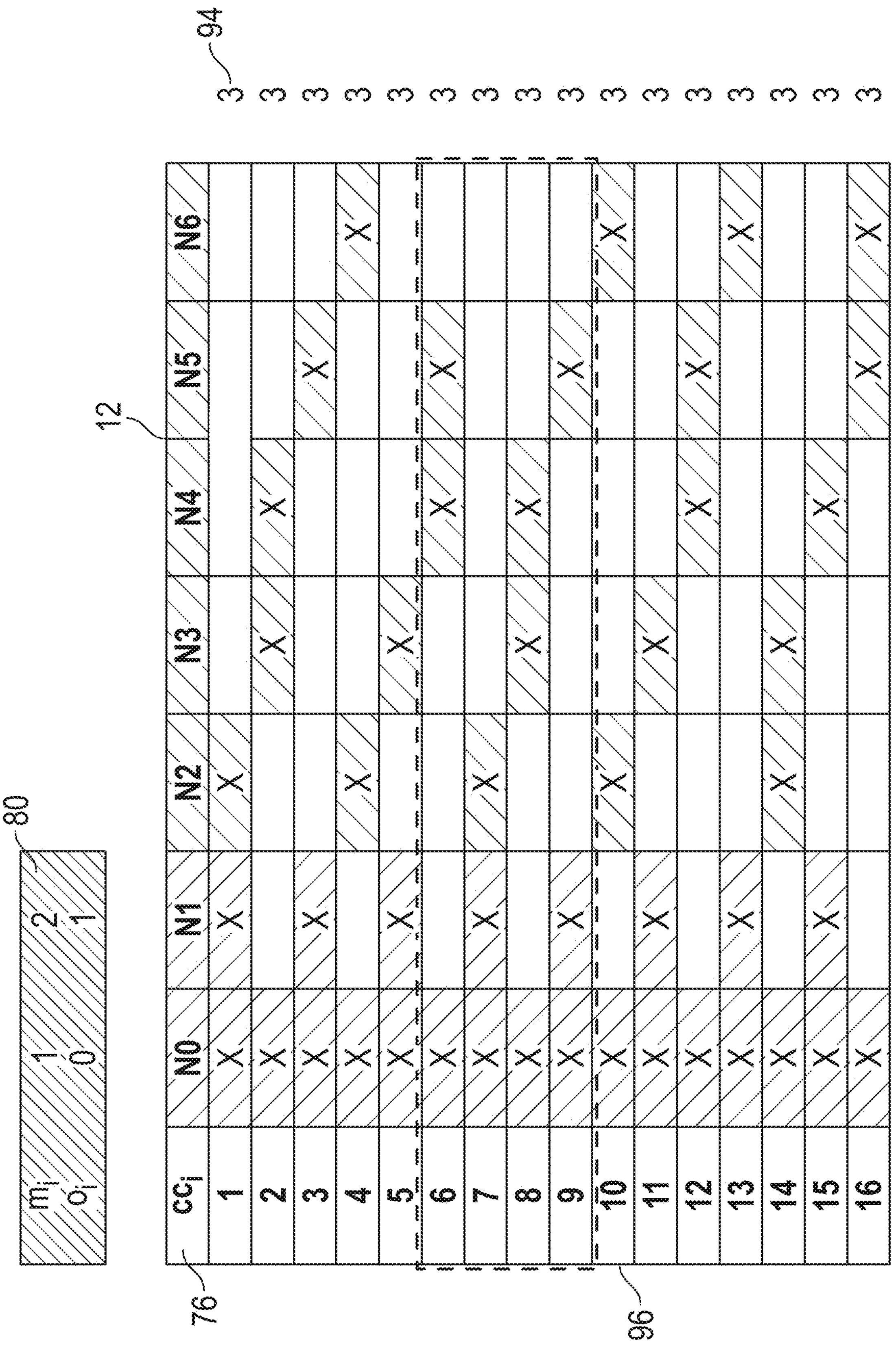
FIG. 7 is a fourth table illustrating transmission opportunities for the plurality of nodes relative to the local cycle counter 76 using a dynamic slot filing schedule according to an exemplary embodiment.

Referring to FIG. 7, a fourth table 92 illustrating an exemplary embodiment of transmission opportunities for the plurality of nodes 12 relative to the local cycle counter 76 using the dynamic slot filing schedule is shown. Each of the columns of the fourth table 92 represent the plurality of nodes 12 and each of the rows of the fourth table 92 represent the value of the local cycle counter 76 incrementally from the top of the fourth table 92 to the bottom of the fourth table 92.

The dynamic slot filling schedule is configured in the scheduling block 64 and allows low latency nodes to have more frequent transmission opportunities across multiple communication cycles of the 10Base-T1S data bus 14 based on latency requirements of the network 10. The dynamic slot filling schedule also gives transmission opportunities to best-effort nodes each communication cycle based on a maximum Ethernet frame value 94. The feature of the dynamic slot filling schedule giving transmission opportunities to best-effort nodes based on the maximum Ethernet frame value reduces worst-case latency for transmission by low latency nodes by reducing the number of nodes that have a transmission opportunity each communication cycle, allowing for shorter communication cycles and more frequent transmission opportunities for each low latency node. The dynamic slot filling schedule receives the maximum Ethernet frame value 94 from the functional software block 60, which defines the maximum number of Ethernet frames that may be transmitted from the plurality of nodes 12 during a given communication cycle.

The dynamic slot filling schedule handles the determination of whether a respective node from the plurality of nodes 12 has a transmission opportunity during a given communication cycle differently depending on the corresponding priority level of the respective node. When the respective node is a low latency node, the dynamic slot filling schedule receives the set of modulo operation pluralities of network device parameters 80 from the functional software block 60 and implements the modulo operation based schedule to determine whether the low latency node has a transmission opportunity during the given communication cycle.

It should be appreciated that in the exemplary embodiment, each of the modulo operation pluralities of network device parameters from the set of modulo operation pluralities of network device parameters 80 have different value configurations for $m_i$ and $o_i$ compared to the exemplary embodiments corresponding to the first table 78 and the second table 82. It should also be appreciated that only low latency nodes from the plurality of nodes 12 have corresponding $m_i$ and $o_i$ values when implementing the dynamic slot filling schedule.

When the respective node is a best-effort node, the dynamic slot filling schedule determines whether the best-effort node has a transmission opportunity during the given communication cycle based on the maximum Ethernet frame value 94 and a round-robin sequence of the best-effort nodes from the plurality of nodes 12. When a number of Ethernet frames transmitted during the given communication cycle is less than the maximum Ethernet frame value 94 and after the modulo operation based schedule has been executed for the low latency nodes, the best-effort nodes are given transmission opportunities based on the round-robin sequence. The round-robin sequence starts by giving a transmission opportunity to the best-effort node with the node ID with the lowest value and then continues by giving transmission opportunities to best-effort nodes to node IDs in ascending order. The best-effort nodes continue to receive transmission opportunities until the number of Ethernet frames transmitted during the given communication cycle are greater than or equal to the maximum Ethernet frame value 94. It should be appreciated that a completion of the round-robin sequence may take place over multiple communication cycles. It should also be appreciated that once the best-effort node from the plurality of nodes 12 with the highest node ID value has a transmission opportunity, the round-robin sequence restarts, starting with the best-effort node with the lowest node ID value.

In the exemplary embodiment, the plurality of nodes 12 has seven nodes, the maximum Ethernet frame value 94 is configured to a value of three, and the set of modulo operation pluralities of network device parameters 80 has a plurality of network device parameters $m_i$=1, $o_i$=0 corresponding to node ID zero and $m_i$=2, $o_i$=1 corresponding to node ID one. It should be appreciated that node ID zero and node ID one having modulo operation pluralities of network device parameters indicates that node ID zero and node ID one are low latency nodes. It should also be appreciated that node ID two, node ID three, node ID four, node ID five, and node ID six not having modulo operation pluralities of network device parameters indicates that node ID two, node ID three, node ID four, node ID five, and node ID six are best-effort nodes.

In the exemplary embodiment, after inputting the corresponding plurality of network device parameters into the modulo operation equation, when the local cycle counter 76 has a value of one, node ID zero and node ID one have a transmission opportunity (represented by an "X" within the corresponding cell of the fourth table 92). When the local cycle counter 76 has a value of two, node ID zero has a transmission opportunity and node ID one does not have a transmission opportunity. The pattern of the communication cycles for the low latency nodes then repeats, where node ID zero has a transmission opportunity every communication cycle and node ID one has a transmission opportunity every other communication cycle.

In the exemplary embodiment, after the low latency nodes are given transmission opportunities determined by the modulo operation based schedule, the best-effort nodes node ID two, node ID three, node ID four, node ID five, and node ID six are given transmission opportunities based on the maximum Ethernet frame value 94 and the round-robin sequence. When the local cycle counter 76 has a value of one, node ID two has a transmission opportunity, as node ID two is the best-effort node with the lowest node ID value. Since node ID zero, node ID one, and node ID two are given transmission opportunities to transmit an Ethernet frame and do transmit an Ethernet frame when the local cycle counter 76 has a value of one, the number of Ethernet frames transmitted when the local cycle counter 76 has a value of one is three, equaling the maximum Ethernet frame value 94 and terminating the communication cycle where the local cycle counter 76 has a value of one.

When the local cycle counter 76 has a value of two, node ID three and node ID four has a transmission opportunity, as node ID three and node ID four are the next best-effort nodes in the round-robin sequence. When the local cycle counter 76 has a value of two, two best-effort nodes are given a transmission opportunity instead of one, unlike when the local cycle counter 76 had a value of one, because only one low latency node transmits an Ethernet frame when the local cycle counter 76 has a value of two as opposed to two low latency nodes transmitting Ethernet frames when the local cycle counter 76 has a value of one. Since node ID zero, node ID three, and node ID four are given transmission opportunities to transmit an Ethernet frame and do transmit an Ethernet frame when the local cycle counter 76 has a value of two, the number of Ethernet frames transmitted when the local cycle counter 76 has a value of two is three, equaling the maximum Ethernet frame value 94 and terminating the communication cycle where the local cycle counter 76 has a value of two.

When the local cycle counter 76 has a value of three, node ID five has a transmission opportunity, as node ID five is the next best-effort node in the round-robin sequence. Since node ID zero, node ID one, and node ID five are given transmission opportunities to transmit an Ethernet frame and do transmit an Ethernet frame when the local cycle counter 76 has a value of three, the number of Ethernet frames transmitted when the local cycle counter 76 has a value of three is three, equaling the maximum Ethernet frame value 94 and terminating the communication cycle where the local cycle counter 76 has a value of three.

When the local cycle counter 76 has a value of four, node ID six and node ID two have transmission opportunities, as node ID six and node ID two are the next best-effort nodes in the round-robin sequence. Since node ID zero, node ID six, and node ID two are given transmission opportunities to transmit an Ethernet frame and do transmit an Ethernet frame when the local cycle counter 76 has a value of four, the number of Ethernet frames transmitted when the local cycle counter 76 has a value of four is three, equaling the maximum Ethernet frame value 94 and terminating the communication cycle where the local cycle counter 76 has a value of four. The pattern of the communication cycles for the best-effort nodes then continues to follow the round-robin sequence, allowing for one best-effort node and two best-effort nodes to have transmission opportunities every other communication cycle.

It should be appreciated that in an alternative exemplary embodiment, when following the IEEE 802.3cg Clause 147 guidelines, the configuration of the set of modulo operation pluralities of network device parameters 80 may indicate that there are as many as eight low latency nodes, as long as there are no more than eight nodes in the plurality of nodes 12. In another alternative exemplary embodiment, when the IEEE 802.3cg Clause 147 guidelines are not followed, the plurality of nodes 12 may have more than eight nodes, meaning there may be more than eight low latency nodes connected to the network 10. It should also be appreciated that while the configuration of the set of modulo operation pluralities of network device parameters 80 in the second exemplary embodiment limits the number of the plurality of nodes 12 that may have a transmission opportunity in the given communication cycle to three, in an alternative embodiment, the configuration of the set of modulo operation pluralities of network device parameters 80 may allow up to all enabled nodes from the plurality of nodes 12 to have a transmission opportunity in the given communication cycle.

It should also be appreciated that while the maximum Ethernet frame value 94 limits the number of Ethernet frames that may be transmitted by the plurality of nodes 12 during a given communication cycle to three, the maximum Ethernet frame value 94 may allow for up to as many Ethernet frames transmitted across the transmission medium 18 during a given communication cycle as there are nodes in the plurality of nodes 12.

It should be appreciated that while in the exemplary embodiment the set of modulo operation pluralities of network device parameters 80 are used to determine whether a low latency node has a transmission opportunity during a given communication cycle, in an alternative exemplary embodiment, the set of modulo operation pluralities of network device parameters 80 may be used to determine whether a best-effort node has a transmission opportunity during a given communication cycle. When the set of modulo operation pluralities of network device parameters 80 are used to determine whether a best-effort node has a transmission opportunity during a given communication cycle, a low latency node is determined to have a transmission opportunity during the given communication cycle based on the maximum Ethernet frame value 94 and the round-robin sequence. It should also be appreciated that in another alternative exemplary embodiment, the set of modulo operation pluralities of network device parameters 80 or the set of repeating pattern pluralities of network device parameters 90 are not used to determine transmission opportunities for low latency nodes or best-effort nodes. In the alternative exemplary embodiment where a set of network device parameters are not used to determine whether low latency nodes or best-effort nodes have a transmission opportunity, the maximum Ethernet frame value 94 and the round-robin sequence are used to determine whether a low latency node and a best-effort node have a transmission opportunity during a given communication cycle.

Figure 8:
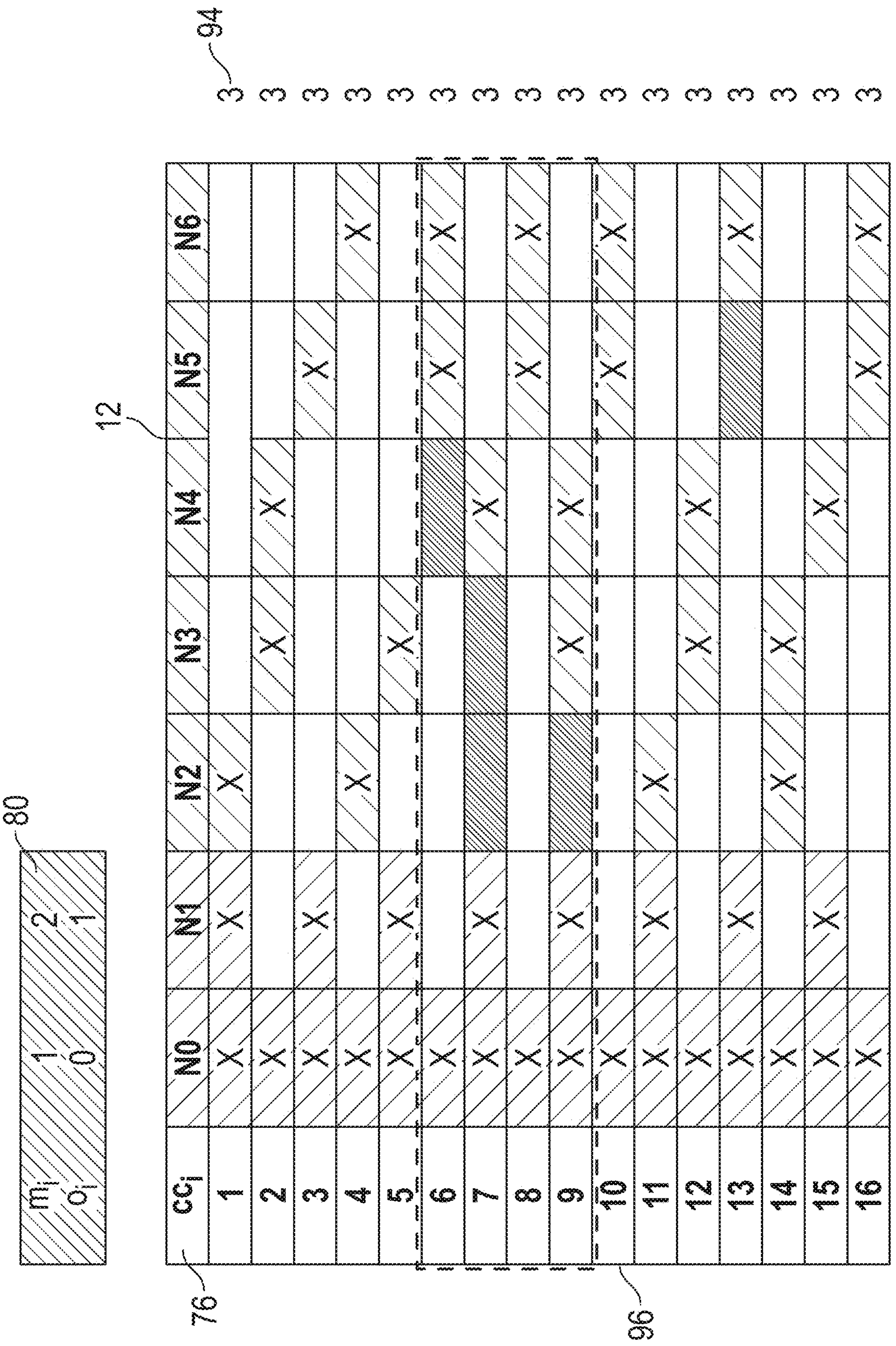
FIG. 8 is a fifth table illustrating transmission opportunities for the plurality of nodes relative to the local cycle counter using the dynamic slot filing schedule when some of the plurality of nodes cede a given transmission opportunity according to an exemplary embodiment.

Referring to FIG. 8, a fifth table 96 illustrating an exemplary embodiment of transmission opportunities for the plurality of nodes 12 relative to the local cycle counter 76 using the dynamic slot filing schedule when some of the plurality of nodes 12 cede a given transmission opportunity is shown. Each of the columns of the fifth table 96 represent the plurality of nodes 12 and each of the rows of the fifth table 96 represent the value of the local cycle counter 76 incrementally from the top of the fifth table 96 to the bottom of the fifth table 96. It should be appreciated that the number of nodes in the plurality of nodes 12 in the fifth table 96 is similar to the number of nodes in the plurality of nodes 12 in the fourth table 92. It should also be appreciated that the pattern of transmission opportunities given to the low latency nodes from the plurality of nodes 12 is similar to the pattern illustrated in the fourth table 92. It should further be appreciated that, before the local cycle counter 76 has a value of six, the pattern of the transmission opportunities given to the best-effort nodes of plurality of nodes 12 is similar to the pattern illustrated in the fourth table 92. It should further be appreciated that the maximum Ethernet frame value 94 and the set of modulo operation pluralities of network device parameters 80 are shared with the values in the exemplary embodiment illustrated in FIG. 7.

Regarding the low latency nodes, after inputting the corresponding plurality of network device parameters into the modulo operation equation, when the local cycle counter 76 has a value of five, node ID zero and node ID one have a transmission opportunity (represented by an "X" within the corresponding cell of the fourth table 92). Regarding the best-effort nodes, when the local cycle counter 76 has a value of five, node ID three has a transmission opportunity, as node ID three is the next best-effort node in the round-robin sequence. Since node ID zero, node ID one, and node ID three are given transmission opportunities to transmit an Ethernet frame and do transmit an Ethernet frame when the local cycle counter 76 has a value of five, the number of Ethernet frames transmitted when the local cycle counter 76 has a value of five is three, equaling the maximum Ethernet frame value 94 and terminating the communication cycle where the local cycle counter 76 has a value of five.

When the local cycle counter 76 has a value of six, best-effort nodes node ID five and node ID six have a transmission opportunity. While node ID four is the next best-effort node in the round-robin sequence, since node ID four does not have an Ethernet frame to transmit, node ID four cedes the transmission opportunity, allowing for node ID five to be the next best-effort node in the round-robin sequence to receive a transmission opportunity. Since node ID zero, node ID five, and node ID six are given transmission opportunities to transmit an Ethernet frame and do transmit an Ethernet frame when the local cycle counter 76 has a value of six, the number of Ethernet frames transmitted when the local cycle counter 76 has a value of six is three, equaling the maximum Ethernet frame value 94 and terminating the communication cycle where the local cycle counter 76 has a value of six.

When the local cycle counter 76 has a value of seven, best-effort node node ID four has a transmission opportunity. While node ID two is the next best-effort node in the round-robin sequence, since node ID two does not have an Ethernet frame to transmit, node ID two cedes the transmission opportunity, allowing for node ID three to be the next best-effort node in the round-robin sequence to receive a transmission opportunity. Node ID three also does not have an Ethernet frame to transmit, so node ID three cedes the transmission opportunity, allowing for node ID four to be the next best-effort node in the round-robin sequence to receive a transmission opportunity. Since node ID zero, node ID one, and node ID four are given transmission opportunities to transmit an Ethernet frame and do transmit an Ethernet frame when the local cycle counter 76 has a value of seven, the number of Ethernet frames transmitted when the local cycle counter 76 has a value of seven is three, equaling the maximum Ethernet frame value 94 and terminating the communication cycle where the local cycle counter 76 has a value of seven.

When the local cycle counter 76 has a value of eight, best-effort nodes node ID five and node ID six have a transmission opportunity, as node ID five and node ID six are the next best-effort nodes in the round-robin sequence. Since node ID zero, node ID five, and node ID six are given transmission opportunities to transmit an Ethernet frame and do transmit an Ethernet frame when the local cycle counter 76 has a value of eight, the number of Ethernet frames transmitted when the local cycle counter 76 has a value of eight is three, equaling the maximum Ethernet frame value 94 and terminating the communication cycle where the local cycle counter 76 has a value of eight.

When the local cycle counter 76 has a value of nine, best-effort node node ID three has a transmission opportunity. While node ID two is the next best-effort node in the round-robin sequence, since node ID two does not have an Ethernet frame to transmit, node ID two cedes the transmission opportunity, allowing for node ID three to be the next best-effort node in the round-robin sequence to receive a transmission opportunity. Since node ID zero, node ID one, and node ID three are given transmission opportunities to transmit an Ethernet frame and do transmit an Ethernet frame when the local cycle counter 76 has a value of nine, the number of Ethernet frames transmitted when the local cycle counter 76 has a value of nine is three, equaling the maximum Ethernet frame value 94 and terminating the communication cycle where the local cycle counter 76 has a value of nine. The pattern of the communication cycles for the low latency nodes then repeats, where node ID zero has a transmission opportunity every communication cycle and node ID one has a transmission opportunity every other communication cycle. The pattern of the communication cycles for the best-effort nodes also continues to follow the round-robin sequence, allowing for as many best-effort nodes to have transmission opportunities before the maximum Ethernet frame value is reached, moving along the round-robin sequence when a best-effort node cedes a transmission opportunity.

It should be appreciated that in an alternative exemplary embodiment, when following the IEEE 802.3cg Clause 147 guidelines, the configuration of the set of modulo operation pluralities of network device parameters 80 may indicate that there are as many as eight low latency nodes, as long as there are no more than eight nodes in the plurality of nodes 12. In another alternative exemplary embodiment, when the IEEE 802.3cg Clause 147 guidelines are not followed, the plurality of nodes 12 may have more than eight nodes, meaning there may be more than eight low latency nodes connected to the network 10. It should also be appreciated that while the configuration of the set of modulo operation pluralities of network device parameters 80 in the second exemplary embodiment limits the number of the plurality of nodes 12 that may have a transmission opportunity in the given communication cycle to three, in an alternative embodiment, the configuration of the set of modulo operation pluralities of network device parameters 80 may allow up to all enabled nodes from the plurality of nodes 12 to have a transmission opportunity in the given communication cycle.

It should also be appreciated that while the maximum Ethernet frame value 94 limits the number of Ethernet frames that may be transmitted by the plurality of nodes 12 during a given communication cycle to three, the maximum Ethernet frame value 94 may allow for up to as many Ethernet frames transmitted across the transmission medium 18 during a given communication cycle as there are nodes in the plurality of nodes 12.

In an alternative exemplary embodiment where the CBTS of 10Base-T1S is enabled, the dynamic slot filling schedule may increase the value of the credit counter or decrease the value of the credit counter at the initiation of a communication cycle based on, in a non-limiting list of examples, the number of Ethernet frames transmitted or the cumulative size of the data payloads of the Ethernet frames transmitted from the respective queue corresponding to the credit counter. The dynamic slot filling schedule increases or decreases the value of the credit counter while respecting the maximum Ethernet frame value 94 when determining which best-effort nodes from the plurality of nodes 12 will have a transmission opportunity during a given transmission cycle.

It should be appreciated that while in the exemplary embodiment the dynamic slot filling schedule uses the modulo operation based schedule for determining whether a low latency node will have a transmission opportunity during a given communication cycle, in an alternative exemplary embodiment, the dynamic slot filling schedule may use, in a non-limiting example, the repeating pattern schedule for determining whether a low latency node will have a transmission opportunity during a given communication cycle.

Figure 9:
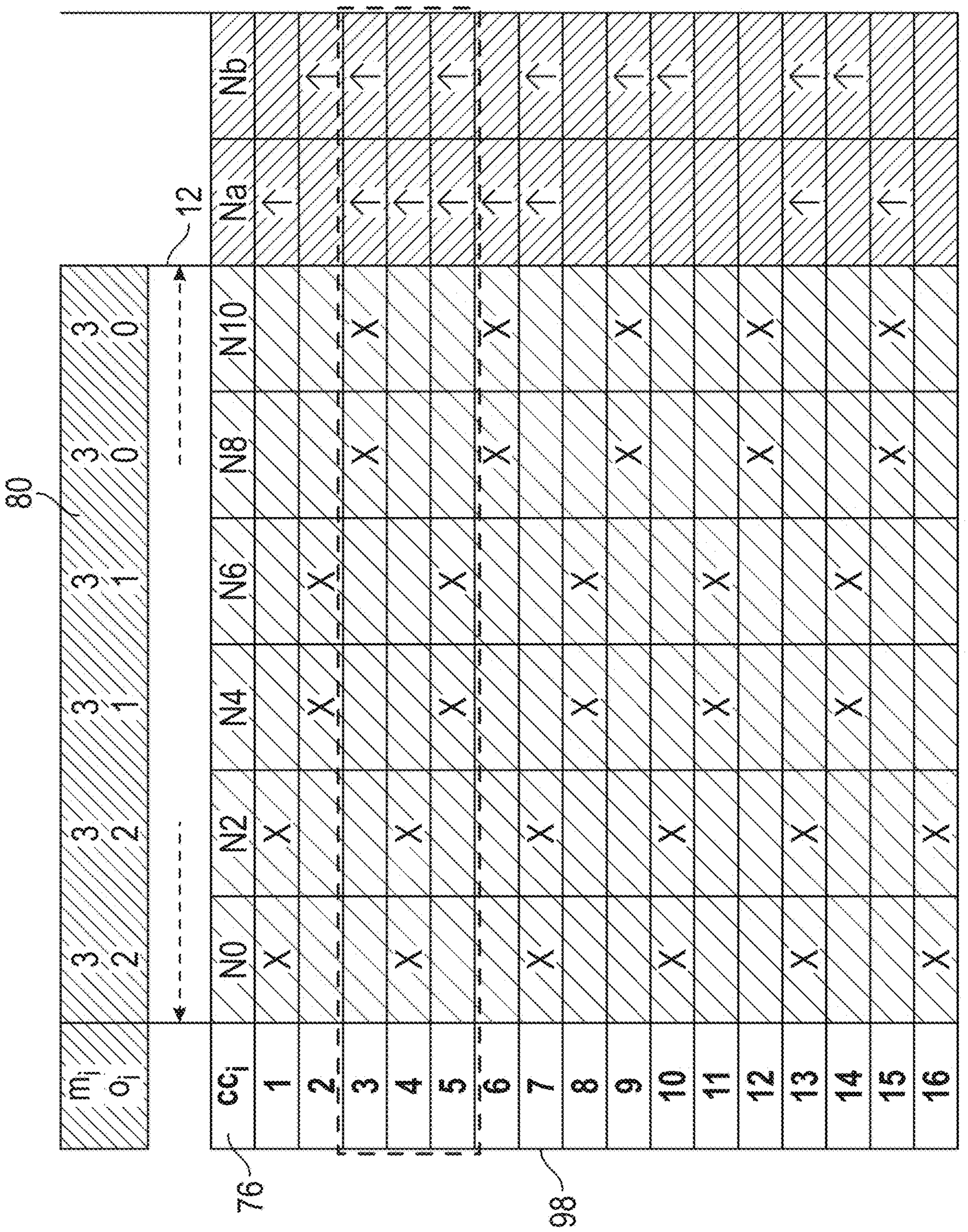
FIG. 9 is a sixth table illustrating transmission opportunities for the plurality of nodes relative to the local cycle counter using a dynamic carrier sense multiple access with collision detection (CSMA-CD) slot filing schedule according to an exemplary embodiment.
Figure 10:
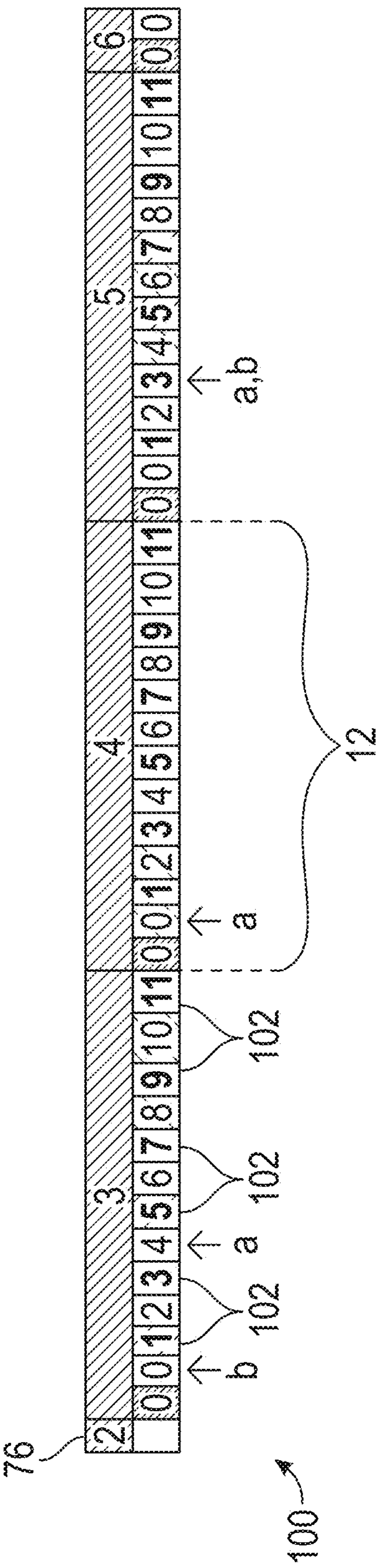
FIG. 10 is a CSMA-CD schedule diagram of the transmission opportunities of the plurality of nodes relative to the local cycle counter using the dynamic CSMA-CD slot filling schedule according to an exemplary embodiment.

Referring to FIG. 9 and FIG. 10, a sixth table 98 illustrating an exemplary embodiment of transmission opportunities for the plurality of nodes 12 relative to the local cycle counter 76 using the dynamic CSMA-CD slot filing schedule and a CSMA-CD schedule diagram 100 of the transmission opportunities of the plurality of nodes 12 relative to the local cycle counter 76 using the dynamic CSMA-CD slot filling schedule are shown. Each of the columns of the sixth table 98 represent the plurality of nodes 12 and each of the rows of the sixth table 98 represent the value of the local cycle counter 76 incrementally from the top of the sixth table 98 to the bottom of the sixth table 98. The pattern of communication cycles in the sixth table 98 is similar to the pattern of communication cycles in the CSMA-CD schedule diagram 100.

The dynamic CSMA-CD slot filling schedule is configured in the scheduling block 64 and allows low latency nodes using the CSMA-CD access method to have more frequent transmission opportunities across multiple communication cycles of the 10Base-T1S data bus 14 based on latency requirements of the network 10. The dynamic CSMA-CD slot filling schedule also gives transmission opportunities to best-effort nodes using the PLCA sublayer 48 to transmit each communication cycle based on the maximum Ethernet frame value. The feature of the dynamic CSMA-CD slot filling schedule giving transmission opportunities to best-effort nodes based on the maximum Ethernet frame value reduces worst-case latency for transmission by low latency nodes by reducing the number of nodes that have a transmission opportunity each communication cycle, allowing for shorter communication cycles and more frequent transmission opportunities for each low latency node. The dynamic CSMA-CD slot filling schedule is also able to accommodate nodes using the CSMA-CD access method to transmit an Ethernet frame and the PLCA sublayer 48 to transmit an Ethernet frame. It should be appreciated when a node uses the CSMA-CD access method to transmit an Ethernet frame, it does not use the PLCA sublayer 48 to transmit and vice versa. The dynamic CSMA-CD slot filling schedule receives the maximum Ethernet frame value 94 from the functional software block 60.

The dynamic CSMA-CD slot filling schedule handles the determination of whether a respective node from the plurality of nodes 12 has a transmission opportunity during a given communication cycle differently depending on the corresponding priority level of the respective node. When the respective node is a best-effort node, the dynamic CSMA-CD slot filling schedule receives the set of modulo operation pluralities of network device parameters 80 from the functional software block 60 and implements the modulo operation based schedule using the PLCA sublayer 48 to determine whether the best-effort node has a transmission opportunity during the given communication cycle. When the respective node is a low latency node, the dynamic CSMA-CD slot filling schedule uses the CSMA-CD mechanism 47 to determine whether the low latency node has a transmission opportunity during the given communication cycle. It should be appreciated that in the exemplary embodiment, each of the modulo operation pluralities of network device parameters from the set of modulo operation pluralities of network device parameters 80 have different value configurations for $m_i$ and $o_i$ compared to the exemplary embodiments of FIGS. 4-8.

In the exemplary embodiment, the plurality of nodes 12 has six best effort nodes and the set of modulo operation pluralities of network device parameters 80 has a plurality of network device parameters $m_i=3$, $o_i=2$ corresponding to node ID zero, $m_i=3$, $o_i=2$ corresponding to node ID two, $m_i=3$, $o_i=1$ corresponding to node ID four, $m_i=3$, $o_i=1$ corresponding to node ID six, $m_i=3$, $o_i=0$ corresponding to node ID eight, and $m_i=3$, $o_i=0$ corresponding to node ID ten. It should be appreciated that in the exemplary embodiment, each of the enabled best-effort nodes have only even numbered node IDs, leaving a plurality of gaps 102 in between best-effort node transmission opportunities. The plurality of nodes 12 has two low latency nodes (named node Na and node Nb). It should be appreciated that while the low latency nodes are named, the designations Na and Nb are not node IDs.

In the exemplary embodiment, after inputting the corresponding plurality of network device parameters into the modulo operation equation, when the local cycle counter 76 has a value of one, node ID zero and node ID two have a transmission opportunity (represented by an "X" within the corresponding cell of the sixth table 98). When the local cycle counter 76 has a value of two, node ID four and node ID six have a transmission opportunity. When the local cycle counter 76 has a value of three, node ID eight and node ID ten have a transmission opportunity. The pattern of the communication cycles then repeat, where a respective consecutive pair of best-effort nodes have a transmission opportunity every third communication cycle.

While the pattern of the communication cycles repeats for the best-effort nodes, the low latency nodes using the CSMA-CD access method listen to the transmission medium 18 to determine whether other nodes are transmitting across the transmission medium 18. The plurality of gaps 102 in between best-effort node transmission opportunities allow for regulated periods of time where the transmission medium 18 is silent, affording the low latency nodes transmission opportunities across the transmission medium 18.

In the CSMA-CD schedule diagram 100, when the local cycle counter 76 has a value of three, when the modulo operator based schedule is determining whether node ID zero has a transmission opportunity, node Nb has an Ethernet frame prepared to be transmitted across the transmission medium 18. When the modulo operator based schedule is determining whether node ID one has a transmission opportunity, Node Nb determines the transmission medium 18 is silent, as node ID one belongs to one of the plurality of gaps 102, and uses the CSMA-CD access method to transmit an Ethernet frame across the transmission medium 18. While the local cycle counter 76 continues to have a value of three, when the modulo operator based schedule is determining whether node ID four has a transmission opportunity, node Na has an Ethernet frame prepared to be transmitted across the transmission medium 18. When the modulo operator based schedule is determining whether node ID five has a transmission opportunity, node Na determines the transmission medium 18 is silent, as node ID five belongs to one of the plurality of gaps 102, and uses the CSMA-CD access method to transmit an Ethernet frame across the transmission medium 18.

In the CSMA-CD schedule diagram 100, when the local cycle counter 76 has a value of four, when the modulo operator based schedule is determining whether node ID zero has a transmission opportunity, node Na has an Ethernet frame prepared to be transmitted across the transmission medium 18. When the modulo operator based schedule is determining whether node ID one has a transmission opportunity, node Na determines the transmission medium 18 is silent, as node ID one belongs to one of the plurality of gaps 102, and uses the CSMA-CD access method to transmit an Ethernet frame across the transmission medium 18.

In the CSMA-CD schedule diagram 100, when the local cycle counter 76 has a value of five, when the modulo operator based schedule is determining whether node ID three has a transmission opportunity, node Na and node Nb have an Ethernet frame prepared to be transmitted across the transmission medium 18. When the modulo operator based schedule determines node ID four has a transmission opportunity and node ID four transmits an Ethernet frame across the transmission medium 18, node Na and node Nb attempt to transmit an Ethernet frame, but terminate transmission to avoid a collision of Ethernet frames, as node ID four is transmitting an Ethernet frame, and wait for a random period of time to reattempt transmission. When the modulo operator based schedule determines whether node ID five has a transmission opportunity, the random period of time for node Na has elapsed, and determining that the transmission medium 18 is silent, as node ID five belongs to one of the plurality of gaps 102, node Na uses the CSMA-CD access method to transmit an Ethernet frame across the transmission medium 18.

When the modulo operator based schedule determines node ID six has a transmission opportunity and node ID six transmits an Ethernet frame across the transmission medium 18, the random period of time for node Nb has elapsed. Since node Nb determines the transmission medium 18 is not silent, node Nb waits for a random period of time to reattempt transmission. When the modulo operator based schedule determines whether node ID seven has a transmission opportunity, the random period of time for node Nb has elapsed, and determining that the transmission medium 18 is silent, as node ID seven belongs to one of the plurality of gaps 102, node Nb uses the CSMA-CD access method to transmit an Ethernet frame across the transmission medium 18.

It should be appreciated that in an alternative exemplary embodiment, when following the IEEE 802.3cg Clause 147 guidelines, the configuration of the set of modulo operation pluralities of network device parameters 80 may indicate that there are as many as seven best-effort nodes and as many as seven low latency nodes, as long as there are no more than eight nodes in the plurality of nodes 12. In another alternative exemplary embodiment, when the IEEE 802.3cg Clause 147 guidelines are not followed, the plurality of nodes 12 may have more than eight nodes, meaning there may be more than seven low latency nodes and more than seven best-effort nodes. It should also be appreciated that while the configuration of the set of modulo operation pluralities of network device parameters 80 in the exemplary embodiment limits the number of best-effort nodes from the plurality of nodes 12 that may have a transmission opportunity in the given communication cycle to two, in an alternative embodiment, the configuration of the set of modulo operation pluralities of network device parameters 80 may allow up to all enabled best-effort nodes from the plurality of nodes 12 to have a transmission opportunity in the given communication cycle. It should be further appreciated that in an alternative exemplary embodiment, the configuration of the set of modulo operation pluralities of network device parameters 80 may allow for more transmission opportunities for particular best-effort nodes than for other best-effort nodes over the same amount of communication cycles.

In an alternative exemplary embodiment where the CBTS of 10Base-T1S is enabled, the dynamic CSMA-CD slot filling schedule may increase the value of the credit counter or decrease the value of the credit counter at the initiation of a communication cycle based on, in a non-limiting list of examples, the number of Ethernet frames transmitted or the cumulative size of the data payloads of the Ethernet frames transmitted from the respective queue corresponding to the credit counter. The dynamic CSMA-CD slot filling schedule increases or decreases the value of the credit counter while respecting the maximum Ethernet frame value 94 when determining which best-effort nodes from the plurality of nodes 12 will have a transmission opportunity during a given transmission cycle.

It should be appreciated that while in the exemplary embodiment the dynamic CSMA-CD slot filling schedule uses the modulo operation based schedule for determining whether a best-effort node will have a transmission opportunity during a given communication cycle, in an alternative exemplary embodiment, the dynamic CSMA-CD slot filling schedule may use, in a non-limiting example, the repeating pattern schedule for determining whether a best-effort node will have a transmission opportunity during a given communication cycle.

It should be appreciated that while in the exemplary embodiment the plurality of gaps 102 created by the enabled best-effort nodes each occupy a period of time to determine whether one best-effort node has a transmission opportunity during a given communication cycle, in an alternative exemplary embodiment, each of the plurality of gaps 102 may take a period of time to determine whether up to seven best-effort nodes have a transmission opportunity during a given communication cycle. It should also be appreciated that in an alternative exemplary embodiment, there is not the plurality of gaps 102 that allows for regulated periods of time where the transmission medium 18 is silent, where the low latency nodes use the CSMA-CD mechanism 47 and the CSMA-CD access method to transmit Ethernet frames across the transmission medium 18 without regulated periods of silence on the transmission medium 18.

It should be appreciated that while in the exemplary embodiment the set of modulo operation pluralities of network device parameters 80 are used to determine whether a best-effort node has a transmission opportunity during a given communication cycle, in an alternative exemplary embodiment, the set of modulo operation pluralities of network device parameters 80 may be used to determine whether a low latency node has a transmission opportunity during a given communication cycle. When the set of modulo operation pluralities of network device parameters 80 are used to determine whether a low latency node has a transmission opportunity during a given communication cycle, a best-effort node uses the CSMA-CD mechanism 47 and the CSMA-CD access method to determine whether the best-effort node has a transmission opportunity during the given communication cycle.

The scheduling block 64 of the present disclosure offers several advantages. One such advantage is the implementation of the modulo operation based schedule and the repeating pattern schedule, which reduces a worst-case latency of the network 10 and 10Base-T1S data bus 14 by reducing the number of the plurality of nodes 12 that have a transmission opportunity for any given communication cycle. The implementation of the modulo operation based schedule, the repeating pattern schedule, and the dynamic slot filling schedule allows for shorter communication cycles and low latency nodes having consistently frequent transmission opportunities. The implementation of the dynamic CSMA-CD slot filling schedule also allows for low latency nodes using the CSMA-CD access method to transmit across the transmission medium 18 while scheduling best-effort nodes using another schedule type. Another advantage is allowing for the set of modulo operation pluralities of network device parameters 80 and the set of repeating pattern pluralities of network device parameters 90 to be configured by the functional software block 60, allowing for flexibility and customizability of the frequency particular nodes from the plurality of nodes 12 receive transmission opportunities based on the needs of the network 10. Another such advantage is the implementation of the local cycle counter 76 to assist the scheduling block 64 in determining which of the plurality of nodes 12 has a transmission opportunity during any given communication cycle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling data transmission on a network, the method comprising:

providing a network bus for transmitting the data on the network;

providing a plurality of low priority network devices and a plurality of high priority network devices wherein each of the plurality of low priority network devices and each of the plurality of high priority network devices are electrically connected to the network bus, wherein the data transmitted by the plurality of high priority network devices is of a higher priority to be transmitted than the data transmitted by the plurality of low priority network devices, wherein each of the plurality of low priority network devices and each of the plurality of high priority network devices have a network controller and wherein each network controller is programmed to:

implement a cycle counter on each of the plurality of low priority network devices and each of the plurality of high priority network devices;

assign a network ID value to each of the plurality of low priority network devices and each of the plurality of high priority network devices;

assign a plurality of network device parameters having a pattern depth value determined based on a sequence of bits to each of the plurality of high priority network devices;

receive a maximum device transmission value that dictates the combined number of the plurality of low priority network devices and the plurality of high priority network devices that transmit data on the network bus during an iteration of the cycle counter;

create a schedule for transmission of the data by each of the plurality of low priority network devices and each of the plurality of high priority network devices, wherein the schedule dictates whether each of the plurality of low priority network devices and each of the plurality of high priority network devices transmit data and wherein the schedule allows each of the plurality of high priority network devices to transmit data based on the cycle counter, the plurality of network device parameters, and the maximum device transmission value, including determining a pattern number according to the formula:

$$pn_i=(cc_i \bmod pd_i)+1$$

wherein:

$cc_i$=a value of the cycle counter that tracks a number of communication cycles in which a respective high priority network device of the plurality of high priority network devices has participated;

$pd_i$=the pattern depth value indicating a number of communication cycles executed before a pattern of transmission opportunities repeats; and $pn_i$=the pattern number corresponding to an index of the sequence of bits; and wherein the schedule allows each of the plurality of low priority network devices to transmit data based on the maximum device transmission value and the network ID value of each of the plurality of low priority network devices.

2. The method of claim 1, wherein assign the plurality of network device parameters to each of the plurality of high priority network devices further comprises assigning a modulo value.

3. The method of claim 2, wherein assign the plurality of network device parameters to each of the plurality of high priority network devices further comprises assigning an offset value.

4. The method of claim 3, wherein create the schedule for transmission of the data by each of the plurality of low priority network devices and each of the plurality of high priority network devices further comprises determining whether the following equation is true $(cc_i+o_i) \bmod m_i=0$ when creating the schedule for transmission of the data for each of the plurality of high priority network devices Wherein:

$cc_i$=the value of the cycle counter that tracks a number of communication cycles in which the respective high priority network device of the plurality of high priority network devices has participated;

$o_i$=the offset value corresponding to the respective high priority network device; and $m_i$=the modulo value corresponding to the respective high priority network device.

5. The method of claim 4, wherein create the schedule for transmission of the data by each of the plurality of low priority network devices and each of the plurality of high priority network devices further comprises selecting the values of $m_i$ and $o_i$ such that a predefined number of the plurality of high priority network devices are allowed to transmit data in a cycle.

6. The method of claim 1, wherein the schedule allows each of the plurality of high priority network devices to transmit data when the $pn_i$th index of the sequence of bits of the $pd_i$ is equal to one.

7. The method of claim 1, wherein create the schedule for transmission of the data by each of the plurality of low priority network devices and each of the plurality of high priority network devices further comprises determine whether one of the plurality of low priority network devices transmit the data when the amount of data transmitted during an iteration of the cycle counter is less than the maximum device transmission value and determine whether the network ID value of the one of the plurality of low priority network devices is next in order in a round-robin sequence.

8. A method for controlling data transmission on a network, the method comprising:

providing a network bus for transmitting the data on the network;

providing a plurality of low priority network devices and a plurality of high priority network devices wherein each of the plurality of low priority network devices and each of the plurality of high priority network devices are electrically connected to the network bus and wherein the data transmitted by the plurality of high priority network devices is of a higher priority to be transmitted than the data transmitted by the plurality of low priority network devices and wherein each of the plurality of low priority network devices and each of the plurality of high priority network devices have a network controller and wherein each network controller is programmed to:

implement a cycle counter on each of the plurality of low priority network devices and each of the plurality of high priority network devices;

implement a carrier sense multiple access with collision detection access method in each of the plurality of high priority network devices;

assign a network ID value to each of the plurality of low priority network devices, wherein the difference between each network ID value of each of the plurality of low priority network devices is at least one to create a plurality of transmission gaps in which the plurality of low priority network devices not transmit data;

assign a plurality of network device parameters having a pattern depth value determined based on a sequence of bits to each of the plurality of low priority network devices;

create a schedule for transmission of the data by each of the plurality of low priority network devices and each of the plurality of high priority network devices, wherein the schedule dictates whether each of the plurality of low priority network devices and each of the plurality of high priority network devices transmit data, wherein the schedule allows each of the plurality of high priority network devices to transmit data based on the plurality of transmission gaps, and wherein the schedule allows each of the plurality of low priority network devices to transmit data based on the cycle counter and the plurality of network device parameters, including determining a pattern number according to the formula:

$$pn_i=(cc_i \bmod pd_i)+1$$

wherein:

$cc_i$=a value of the cycle counter that tracks a number of communication cycles in which a respective high priority network device of the plurality of high priority network devices has participated;

$pd_i$=the pattern depth value indicating a number of communication cycles executed before a pattern of transmission opportunities repeats; and $pn_i$=the pattern number corresponding to an index of the sequence of bits.

9. The method of claim 8, wherein assign the plurality of network device parameters to each of the low priority network devices further comprises assigning a modulo value.

10. The method of claim 8, wherein assign the plurality of network device parameters to each of the low priority network devices further comprises assigning an offset value.

11. The method of claim 8, wherein create the schedule for transmission of the data by each of the plurality of low priority network devices and each of the plurality of high priority network devices further comprises determining whether the following equation is true $(cc_i+o_i) \bmod m_i=0$ when creating the schedule for transmission of the data for each of the plurality of low priority network devices Wherein:

$cc_i$=the value of the cycle counter that tracks a number of communication cycles in which the respective low priority network device of the plurality of low priority network devices has participated;

$o_i$=the offset value corresponding to the respective low priority network device; and $m_i$=the modulo value corresponding to the respective low priority network device.

12. The method of claim 11, wherein create the schedule for transmission of the data by each of the plurality of low priority network devices and each of the plurality of high priority network devices further comprises selecting the values of $m_i$ and $o_i$ such that a predefined number of the plurality of low priority network devices are allowed to transmit data in a cycle.

13. The method of claim 8, wherein the schedule allows each of the plurality of low priority network devices to transmit data when the $pn_i$th index of the sequence of bits of the $pd_i$ is equal to one.

14. The method of claim 8, wherein create the schedule for transmission of the data by each of the plurality of low priority network devices and each of the plurality of high priority network devices further comprises each of the plurality of high priority network devices using the carrier sense multiple access with collision detection access method to transmit the during one of the plurality of transmission gaps.

15. A system for controlling data transmission on a network, the system comprising:

a physical network bus for transmitting the data on the network;

a plurality of low priority network devices and a plurality of high priority network devices, wherein each of the plurality of low and high priority network devices comprising processor, a memory, a transceiver, and a plurality of input and output ports, wherein each of the plurality of low priority network devices and each of the plurality of high priority network devices are electrically connected to the physical network bus and wherein the data transmitted by the plurality of high priority network devices is of a higher priority to be transmitted than the data transmitted by the plurality of low priority network devices and wherein each of the plurality of low priority network devices and each of the plurality of high priority network devices have a network controller and wherein each network controller is programmed to:

implement a cycle counter on each of the plurality of low priority network devices and each of the plurality of high priority network devices;

assign a network ID value to each of the plurality of low priority network devices and each of the plurality of high priority network devices;

assign a plurality of network device parameters having a modulo value and an offset value to each of the plurality of high priority network devices;

receive a maximum device transmission value that dictates the combined number of the plurality of low priority network devices and the plurality of high priority network devices that transmit data on the physical network bus during an iteration of the cycle counter;

create a schedule for transmission of the data by each of the plurality of network devices, wherein the schedule dictates whether each of the plurality of network devices transmit data and wherein the schedule allows one of the plurality of low priority network devices to transmit the when the amount of data transmitted during an iteration of the cycle counter is less than the maximum device transmission value and when the network ID value of the one of the plurality of low priority network devices is next in order in a round-robin sequence and wherein the schedule allows each of the plurality of high priority network devices to transmit data when the following equation is true $(cc_i+o_i) \bmod m_i=0$ Wherein:

$cc_i$=a value of the cycle counter that tracks a number of communication cycles in which the respective high priority network device of the plurality of high priority network devices has participated;

$o_i$=the offset value corresponding to the respective high priority network device; and $m_i$=the modulo value corresponding to the respective high priority network device.

* * * * *